United States Patent
Fujita et al.

(10) Patent No.: US 7,040,816 B2
(45) Date of Patent: May 9, 2006

(54) OPTICAL COMMUNICATIONS MODULE, OPTICAL FIBER, AND OPTICAL COUPLING STRUCTURE OF OPTICAL FIBER AND OPTICAL COMMUNICATIONS MODULE

(75) Inventors: Hideaki Fujita, Shiki-gun (JP); Yorishige Ishii, Yamatotakada (JP); Toshihiro Tamura, Shiki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 234 days.

(21) Appl. No.: 10/357,071

(22) Filed: Feb. 3, 2003

(65) Prior Publication Data

US 2003/0169979 A1 Sep. 11, 2003

(30) Foreign Application Priority Data

Mar. 7, 2002 (JP) ............................ 2002-062727

(51) Int. Cl.
*G02B 6/36* (2006.01)
(52) U.S. Cl. ......................................... 385/89; 385/93
(58) Field of Classification Search .................. 385/88, 385/89, 92, 93, 39
See application file for complete search history.

(56) References Cited

U.S. PATENT DOCUMENTS

| | | | | |
|---|---|---|---|---|
| 5,479,545 A | * | 12/1995 | Davenport et al. | 385/43 |
| 5,530,781 A | * | 6/1996 | Takahashi | 385/43 |
| 6,123,463 A | | 9/2000 | Kashihara et al. | |
| 6,351,584 B1 | * | 2/2002 | Horie et al. | 385/31 |
| 6,626,584 B1 | * | 9/2003 | Fujita et al. | 385/88 |
| 2002/0015560 A1 | * | 2/2002 | De Donno et al. | 385/38 |
| 2002/0028047 A1 | * | 3/2002 | Yasuda | 385/79 |
| 2003/0133674 A1 | * | 7/2003 | Fujita et al. | 385/89 |
| 2003/0194185 A1 | * | 10/2003 | Tamura et al. | 385/39 |

FOREIGN PATENT DOCUMENTS

| | | |
|---|---|---|
| CN | 1187627 A | 3/2003 |
| JP | 61-065208 | 4/1986 |
| JP | 08-234060 | 9/1996 |
| JP | 10153720 A * | 6/1998 |
| JP | 11-027217 | 1/1999 |
| JP | 11-352364 | 12/1999 |

OTHER PUBLICATIONS

Chinese Office Action corresponding to Appln. No. 03120276.4.

* cited by examiner

*Primary Examiner*—Sung Pak
(74) *Attorney, Agent, or Firm*—Edwards Angell Palmer & Dodge; David Conlin; Howard M. Gitten

(57) ABSTRACT

At least one of end portions of a light-carrying core portion of a single-conductor optical fiber has an enlarged portion, which is a portion of the core portion larger than other portions of the core portion. An optical communications module includes a light emitting element which generates outgoing light, a sending lens which couples the outgoing light with an end portion of the single-conductor optical fiber, a light receiving element which receives incoming light from the single-conductor optical fiber, and a reflecting mirror which couples the incoming light with the light receiving element. The light emitting element and the sending lens are disposed so that the area in the end portion of the single-conductor optical fiber coupled with the outgoing light is at least partially included in the enlarged portion. The light receiving element and the reflecting mirror are disposed so as to receive incoming light that emerges from the end portion of the single-conductor optical fiber having the enlarged portion.

13 Claims, 13 Drawing Sheets

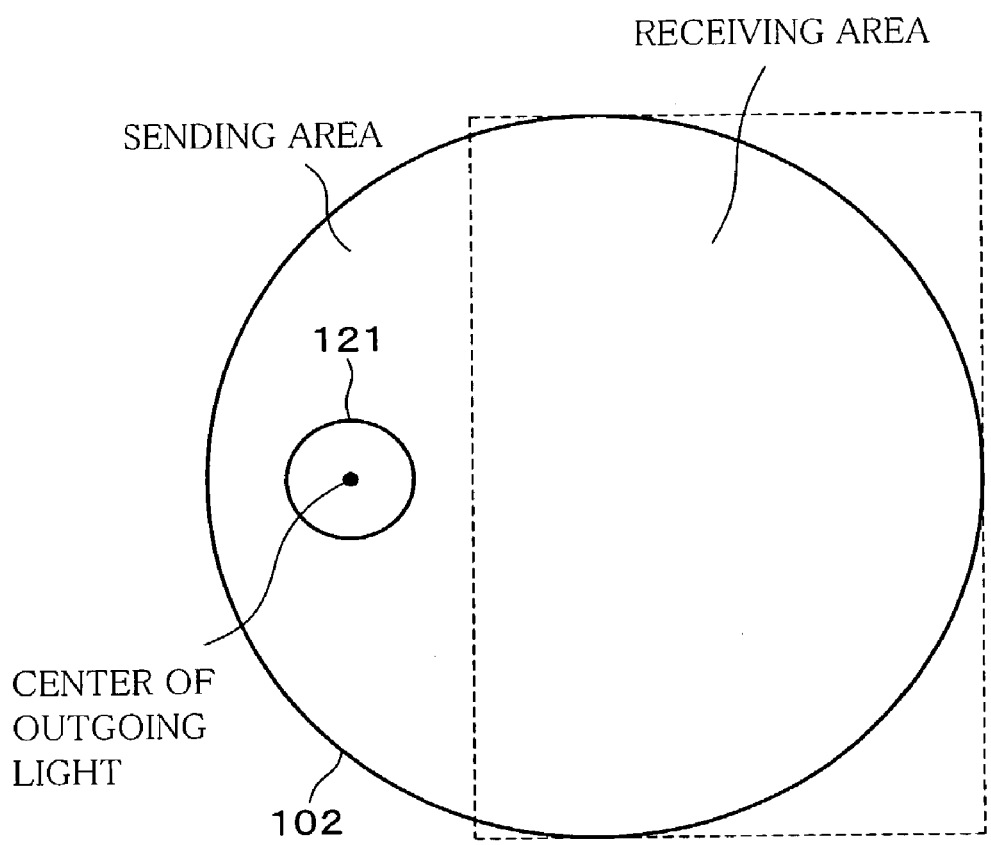

OPTICAL COMMUNICATIONS MODULE, OPTICAL FIBER, AND OPTICAL COUPLING STRUCTURE OF OPTICAL FIBER AND OPTICAL COMMUNICATIONS MODULE

FIELD OF THE INVENTION

The present invention relates to an optical communications module that is capable of bidirectionally sending and receiving an optical signal via a single-conductor core of an optical fiber as a transmission medium. The invention also relates to an optical fiber and an optically coupled structure of the single core optical fiber and the bidirectional optical communications module for an optical communications link.

BACKGROUND OF THE INVENTION

FIG. 11 schematically shows an optical communications link. An optical communications link 3 includes an optical fiber 2 for transmitting light that has been modulated according to a data signal to be transmitted, and optical communications modules 1 that are connected to the both ends of the optical fiber 2 by optical coupling.

The optical communications link 3 can be classified into a number of categories based on the mode of communication. Namely, the optical communications link 3 can be roughly classified into the following three categories: (1) an optical communications link using optical fiber 2 with a single core or multiple cores; (2) an optical communications link in which signals are transmitted bidirectionally or unidirectionally; and (3) an optical communications link in which signals are transmitted simultaneously in full-duplex or semi-duplex. These different modes are often combined, for example, as in a single-conductor full-duplex communication mode, to carry out optical communications.

The optical communications module 1 requires a light emitting element and a light receiving element for bidirectional communications of signals. For unidirectional communications, the optical communications module 1 requires either one of the light emitting element and the light receiving element.

Note that, as the terms are used herein, the light that emerges from the light emitting element of the optical communications module 1 and enters an end portion of the optical fiber 2 will be referred to as "outgoing light", and the light that emerges from an end portion of the optical fiber 2 and enters the light receiving element of the optical communications module 1 will be referred to as "incoming light".

Incidentally, Japanese Publication for Unexamined Patent Application No. 65208/1986 (Tokukaisho 61-65208; published on Apr. 3, 1986) and No. 234060/1996 (Tokuhaihei 8-234060; published on Sep. 13, 1996) disclose a method by which coupling efficiency (transmission efficiency) of transmitted light and optical fiber is improved by way of increasing end faces of the optical fiber.

That is, this method increases end faces of the optical fiber to enable transmitted light to be easily and efficiently coupled even when the core diameter of the optical fiber is small as in a quartz optical fiber. In this way, the method improves tolerance characteristics for misalignment.

The foregoing publications are merely concerned with improvement with regard to a coupling method of optical fiber and light emitting element and they do not describe anything about improving reception efficiency, or a structure that can accommodate to a single-conductor full-duplex mode. In particular, the publications do not provide a method of efficiently separating incoming light and outgoing light from each other and preventing interference of incoming light and outgoing light.

One problem of a conventional full-duplex communication mode using multiple optical fibers is that it is difficult to miniaturize the optical communications module and the cost of the optical fiber is increased as the transmission distance becomes longer. In order to solve this problem, there has been proposed an optical communications module for a single-conductor full-duplex mode, in which a single-conductor optical fiber is used to send and receive signals simultaneously using the light of the same wavelength.

Particularly notable in this regard are plastic optical fibers ("POF" hereinafter). POF has advanced over the last years to attain smaller loss and wider band and are now being applied to home communications and inter-device communications of electrical devices. POF has a large core diameter of about 1 mm, which allows for easy coupling with the optical communications module. This enables the POF to be easily plugged in and out of the optical communications module, thereby providing a user-friendly optical communication link.

In the optical communications module that carries out full-duplex communications using a single-conductor optical fiber and the light source of the same wavelength, it is important to prevent interference of outgoing light and incoming light. Some of the causes of interference between incoming light and outgoing light are:

(1) Reflection at an end face of the optical fiber when outgoing light enters the optical fiber (hereinafter "near-end reflection");

(2) Internally scatted light within the optical communications module (hereinafter "internally scattered light");

(3) Reflection in the optical communications module of the other end in communications (hereinafter "module reflection at the other end"); and (4) Reflection of outgoing light at an end face of the optical fiber when it emerges from the optical fiber (hereinafter "far-end reflection").

In addition, (5) electrically induced interference also causes problems.

In the optical communications link using an optical fiber as a transmission medium, it is also important to efficiently couple incoming light from the optical fiber with a light receiving element, so as to obtain a high S/N (Signal to Noise) ratio.

An example of the conventional single-conductor full-duplex optical communications module can be found, for example, in Japanese Publication for Unexamined Patent Application No. 153720/1998 (Tokukaihei 10-153720; published on Jun. 9, 1998), which describes a method of separating outgoing light and incoming light from each other using a polarized light separator.

Namely, this method works under the principle that the direction of polarization of outgoing light is random in the course of travel through the optical fiber, while the outgoing light reflected at the end face of the optical fiber (near-end reflection) has the same polarization direction. Thus, by interposing the polarized light separator that reflects only polarized light between the optical fiber and the light receiving element, interference by the near-end reflection can be prevented.

However, owning to the fact that about half of the outgoing light is reflected by the polarized light separator, a reception loss of about 3 dB is generated and the outgoing light cannot be used efficiently. Further, because the outgoing light is polarized, it is difficult to use an inexpensive light emitting diode (LED) as the light emitting element.

A solution to this problem is described in Japanese Publication for Unexamined Patent Application No. 27217/1999 (Tokukaihei 11-27217; published on Jan. 29, 1999) and No. 352364/1999 (Tokuhaihei 11-352364; published on Dec. 24, 1999). These publications disclose a method in which outgoing light is incident off-center on the optical fiber and the incoming light that emerges from the other area of the optical fiber is received. This method is described below referring to FIG. 12 and FIG. 13.

Outgoing light 121 from a light emitting element 104 is converged by a sending lens 106 and reflected by a guiding mirror 107 into an end face 108 of an optical fiber 102, off-center from the optical axis. Incoming light 122 that emerges from the end face 108 of the optical fiber 102 is coupled with a light receiving element 105.

FIG. 13 shows how the coupling position of the outgoing light 121 on the end face of the optical fiber 102 is related to a receiving area. In the method in which the outgoing light 121 is incident off-center on the optical fiber 102, the sending area on which the outgoing light 121 is incident is spatially separated from the receiving area on the end face of the single-conductor optical fiber 102. In this way, single-conductor full-duplex communications are realized.

The method, by the larger receiving area than the sending area, is able to separate the outgoing light and the incoming light from each other with a small loss, smaller than 3 dB that is generated in the method using the polarized light separator. As a result, reception efficiency is improved.

Despite improved reception efficiency, the outgoing light 121 still needs to be incident within the core diameter of the end face of the optical fiber 102 for successful coupling with the optical fiber 102. It is therefore necessary, considering a tolerance for axial misalignment of the optical fiber 102 or an assemble tolerance of the optical communications module, that the outgoing light 121 be incident on a position that takes into consideration a tolerance margin from the periphery of the optical fiber 102.

For this reason, it was difficult to provide a sufficiently large receiving area, which made it difficult to provide sufficiently high reception efficiency. Further, a faster communication speed requires a wider communication band. The wider band in a receiver circuit increases electrical noise. Given this and to maintain a sufficient S/N ratio, higher reception efficiency is required.

SUMMARY OF THE INVENTION

The present invention was made in view of the foregoing problems and it is an object of the present invention to provide an optically coupled structure of a single-conductor optical fiber and a bidirectional optical communications module, with which high reception efficiency can be obtained.

In order to achieve this object, the present invention provides an optical communications module for carrying out bidirectional optical communications using a single-conductor optical fiber as a transmission medium, the optical communications module including: a light emitting element, which generates outgoing light; a sending optical system, which couples the outgoing light with the single-conductor optical fiber; a light receiving element, which receives incoming light that emerges from the single-conductor optical fiber; and a receiving optical system, which couples the incoming light with the light receiving element, wherein the receiving optical system is disposed so that the light receiving element receives incoming light that emerges from an enlarged portion of the single-conductor optical fiber, the enlarged portion being an enlarged portion of a light-carrying core section of the single-conductor optical fiber in at least one of end portions of the single-conductor optical fiber.

According to this arrangement, the end portion of the optical fiber, with the enlarged portion, has an increased area for the incoming light to emerge. Accordingly, the intensity of incoming light per unit area of the end portion is reduced.

The provision of the enlarged portion in the end portion of the optical fiber does not necessitate a change in size of an area of the end portion coupled with the outgoing light.

Namely, the intensity of incoming light that emerges from this area of the end portion coupled with the outgoing light is reduced. Thus, a reduction of reception efficiency can be suppressed even though the light receiving element does not receive incoming light that emerges from this area. That is, reception efficiency can be improved.

Note that, provided that reception efficiency is improved over conventionally by also receiving incoming light that emerges from the enlarged portion of the end portion, the light receiving element may be partially coupled with the incoming light that emerges from an area of the end portion other than the area coupled with the outgoing light.

Further, the present invention provides an optical communications module for carrying bidirectional optical communications using a single-conductor optical fiber as a transmission medium, the optical communications module including: a light emitting element, which generates outgoing light; a sending optical system, which couples the outgoing light with the single-conductor optical fiber, a light receiving element, which receives incoming light that emerges from the single-conductor optical fiber; and a receiving optical system, which couples the incoming light with the light receiving element, wherein the light emitting element and the sending optical system are disposed so that an enlarged portion of the single-conductor optical fiber, which is provided as an enlarged portion of a light-carrying core section of the single-conductor optical fiber in at least one of end portions of the single-conductor optical fiber, at least partially constitutes an area of the end portion coupled with the outgoing light.

According to this arrangement, by the provision of the enlarged portion, the end portion of the optical fiber has an increased area that can couple with the outgoing light. This enables the area coupled with the outgoing light to be provided more toward the periphery than conventionally.

Further, the intensity of incoming light that emerges from a central portion of the enlarged portion is much weaker than that of incoming light that emerges from the core section. Thus, the intensity of incoming light that emerges from the area coupled with the outgoing light becomes notably weak when the enlarged portion at least partially includes the area coupled with the outgoing light. Thus, a large reduction of reception efficiency can be suppressed even though the light receiving element does not receive incoming light that emerges from the area coupled with the outgoing light. As a result, reception efficiency can be greatly improved.

Further, the present invention provides an optical fiber as a transmission medium for carrying out optical communications, the optical fiber including: a light-carrying core section; an enlarged portion, which is an enlarged portion of a light-carrying core section of the optical fiber in at least one of end portions of the optical fiber; and a tapered portion, which extends from the enlarged portion of the end portion, tapering toward an optical axis of the optical fiber, the tapered portion being provided so that an angle created by the optical axis of the optical fiber and the tapered portion is greater than an angle defined by a numerical aperture of the optical fiber.

Light propagates through the optical fiber when the angle created by the propagation direction of the light and the optical axis of the optical fiber is at or below the angle defined by the numerical aperture. Thus, according to the foregoing arrangement, the enlarged portion of the end portion has an area from which no light emerges. As a result, the quantity (intensity) of light per unit area of the enlarged portion is reduced.

Thus, the intensity of incoming light that emerges from the area coupled with the outgoing light is always reduced when the enlarged area at least partially includes the area coupled with the outgoing light. This ensures that a reduction of reception efficiency is reduced, even though the light receiving element does not receive incoming light that emerges from the area coupled with the outgoing light. As a result, it is ensured that reception efficiency is improved.

Further, the present invention provides an optical fiber as a transmission medium for carrying out optical communications, the optical fiber including: a light-carrying core section; and an enlarged portion, which is an enlarged portion of a light-carrying core section of the optical fiber in at least one of end portions of the optical fiber, the end portion with the enlarged portion being a concave portion.

According to this arrangement, the enlarged portion is inclined toward the optical axis in the radial direction. In this case, the angle created by the propagation direction of the outgoing light and the optical axis of the optical fiber after the outgoing light is incident on the enlarged portion becomes smaller than it would have been when the enlarged portion has a plane perpendicular to the optical axis.

Incidentally, in order for light to propagate in the optical fiber, the angle created by the propagation direction of the light and the optical axis of the optical fiber needs to be no larger than the angle defined by the numerical aperture. With the optical fiber according to the present invention, the angle created by the propagation direction of the outgoing light and the optical axis of the optical fiber before the outgoing light is coupled with the end portion can be made greater than that obtained when the enlarged portion has a plane perpendicular to the optical axis. This enables the light emitting element and the sending optical system, which are used to cause the outgoing light to enter the optical fiber, to be disposed more toward the periphery in the radial direction, thereby providing more freedom in positioning each constituting element of the optical communications module for optical communications.

Further, the present invention provides an optically coupled structure, including: a single-conductor optical fiber; and an optical communications module for carrying out bidirectional optical communications with the single-conductor optical fiber as a transmission medium, the single-conductor optical fiber including a light-carrying core section and an enlarged portion, the enlarged portion being an enlarged portion of a light-carrying core section of the optical fiber in at least one of end portions of the single-conductor optical fiber, the optical communications module including a light emitting element, which generates outgoing light; a sending optical system, which couples the outgoing light with the single-conductor optical fiber, a light receiving element, which receives incoming light that emerges from the single-conductor optical fiber, and a receiving optical system, which couples the incoming light with the light receiving element, the light receiving element and the receiving optical system being disposed so as to receive incoming light that emerges from the end portion of the single-conductor optical fiber having the enlarged portion.

According to this arrangement, the end portion of the optical fiber, with the enlarged portion, has an increased area for the incoming light to emerge. Accordingly, the intensity of incoming light per unit area of the end portion is reduced.

The provision of the enlarged portion in the end portion of the optical fiber does not necessitate a change in size of an area of the end portion coupled with the outgoing light.

Namely, the intensity of incoming light that emerges from this area of the end portion coupled with the outgoing light is reduced. Thus, a reduction of reception efficiency can be suppressed even though the light receiving element does not receive incoming light that emerges from this area. That is, reception efficiency can be improved.

Further, the present invention provides an optically coupled structure, including: a single-conductor optical fiber; and an optical communications module for carrying out bidirectional optical communications with the single-conductor optical fiber as a transmission medium, the single-conductor optical fiber including a light-carrying core section and an enlarged portion, the enlarged portion being an enlarged portion of a light-carrying core section of the single-conductor optical fiber in at least one of end portions of the single-conductor optical fiber, the optical communications module having a light emitting element, which generates outgoing light, a sending optical system, which couples the outgoing light with the end portion of the single-conductor optical fiber, a light receiving element, which receives incoming light that emerges from the single-conductor optical fiber, and a receiving optical system, which couples the incoming light with the light receiving element, the light emitting element and the sending optical system being provided so that the enlarged portion at least partially constitutes an area of the end portion of the single-conductor optical fiber coupled with the outgoing light.

According to this arrangement, by the provision of the enlarged portion, the end portion of the optical fiber has an increased area that can couple with the outgoing light. This enables the area coupled with the outgoing light to be provided more toward the periphery than conventionally.

Further, the intensity of incoming light that emerges from a central portion of the enlarged portion is much weaker than that of incoming light that emerges from the core section. Thus, the intensity of incoming light that emerges from the area coupled with the outgoing light becomes notably weak when the enlarged portion at least partially includes the area coupled with the outgoing light. Thus, a large reduction of reception efficiency can be suppressed even though the light receiving element does not receive incoming light that emerges from the area coupled with the outgoing light. As a result, reception efficiency can be greatly improved.

For a fuller understanding of the nature and advantages of the invention, reference should be made to the ensuing detailed description taken in conjunction with the accompanying drawings.

BRIEF DESCRIPTION OF THE DRAWINGS

FIG. 1(a) and FIG. 1(b) are schematic diagrams showing a sending area and a receiving area in an end portion of an optical fiber, in which FIG. 1(a) is shows an optical fiber according to the present invention, and FIG. 1(b) shows a conventional optical fiber.

FIG. 2(a) and FIG. 2(b) are schematic diagrams showing NFP of emergent light from an optical fiber, in which FIG. 2(a) shows the optical fiber according to the present invention, and FIG. 2(b) shows the conventional optical fiber.

FIG. 13 is a schematic diagram showing a sending area and a receiving area in an end portion of the optical fiber in connection with the conventional optically coupled structure of FIG. 12.

DESCRIPTION OF THE EMBODIMENTS

Embodiments

Before describing embodiments of the present invention, attention is drawn to an experiment on which the present invention is based. The experiment was conducted to study how intensity distribution (NFP: Near Field Pattern) of light in the vicinity of an end face of an optical fiber changes depending on the configuration of the end face of the optical fiber, with regard to the light that emerges from the optical fiber. The experiment is described below with reference to FIG. 2(a) and FIG. 2(b).

Generally, the light that emerges from an optical fiber 2 of a large core diameter such as POF produces NFP that has the maximum intensity at a central portion of the optical fiber 2 and the weakest intensity on the periphery. The light intensity, however, remains relatively strong in the vicinity of the periphery ("incident position of light into optical fiber" in FIG. 2(b)).

Figure 2:
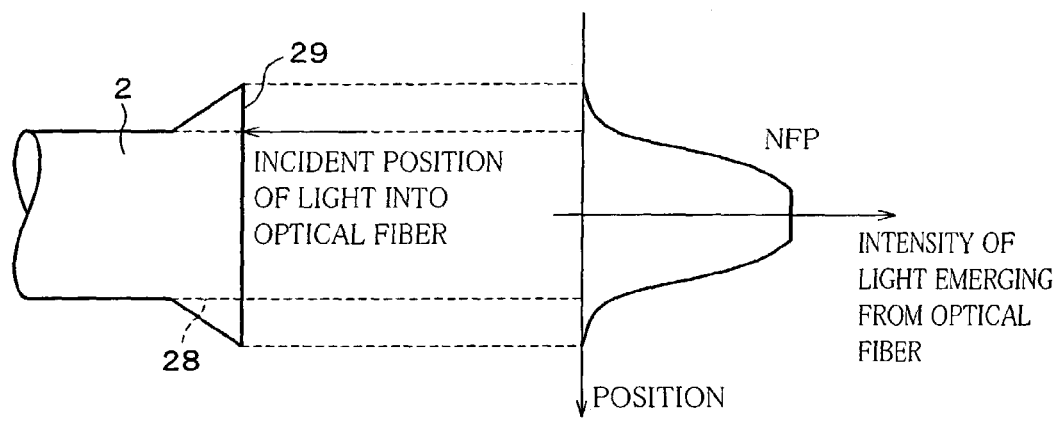
Figure 2:
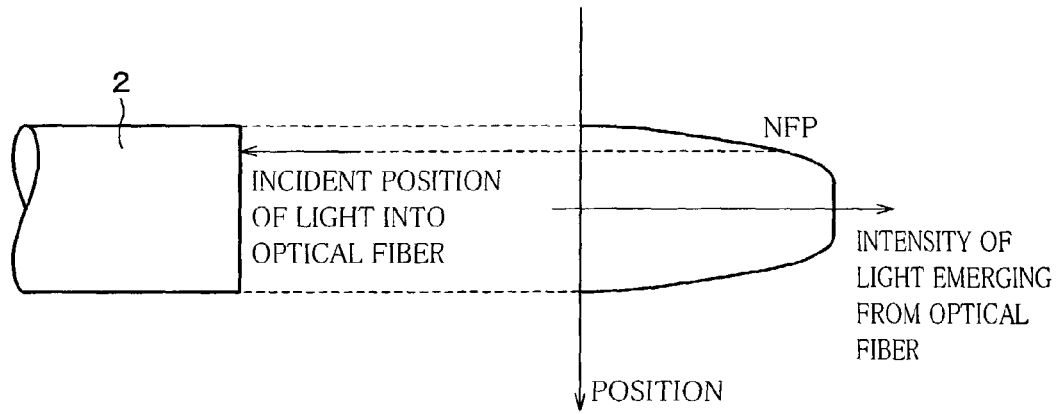

On the other hand, the light from the optical fiber 2 produces a different NFP from that of FIG. 2(b) when the end face of the optical fiber 2 is increased, as shown in FIG. 2(a). Namely, FIG. 2(a) differs from FIG. 2(b) in that the overall intensity of light is smaller and the intensity of the light that emerges from the periphery (enlarged portion 29) of the optical fiber 2 is much weaker, even though the intensity of the light is also the strongest at a central portion of the optical fiber 2.

It should be noted however that, strictly speaking, the NFP of the light from the optical fiber 2 varies with the characteristics of the optical fiber 2 itself, such as the core diameter or numerical aperture, or with the configuration of the enlarged portion 29. Details of this will be described later.

It was found by this experiment that an optically coupled structure of a single-conductor optical fiber and a bidirectional optical communications module with high reception efficiency can be obtained by actively utilizing changes in NFP of light by way of increasing the end face of the optical fiber 2, and by additionally modifying a configuration of an optical system in sending and receiving sections of the optical communications module or a configuration of the end face of the optical fiber 2.

Specifically, there is a large loss of incoming light when the end face of the optical fiber 2 is not enlarged as in the conventional bidirectional optical communications module for single-conductor optical fibers, because the incoming light that emerges from the area of incidence of outgoing light has a relatively strong light intensity, as the NFP of FIG. 2(b) indicates.

The present invention, on the other hand, suppresses a loss of incoming light by the optically coupled structure of a single-conductor optical fiber and a bidirectional optical communications module, in which at least one of the end faces of the optical fiber 2 is enlarged and outgoing light is incident in the vicinity of the enlarged portion 29, as FIG. 2(a) indicates. The following will describe specific configurations of such an optically coupled structure.

First Embodiment

Figure 3:
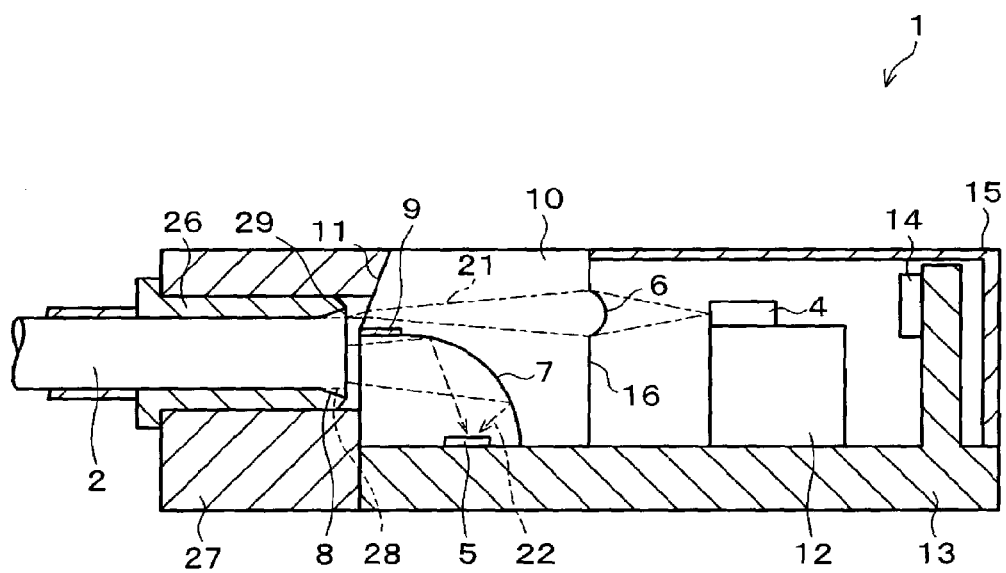
FIG. 3 is a cross sectional view showing an optically coupled structure of a single-conductor optical fiber and a bidirectional optical communications module of one embodiment of the present invention.

Referring to FIG. 3, the following describes one embodiment of the present invention. FIG. 3 shows an optical communications module of the present embodiment.

An optical communications module 1 includes a light emitting element 4, a light receiving element 5, a sending lens (sending optical system) 6, and a reflecting mirror (receiving optical system) 7. The light emitting element 4 generates outgoing light 21, which has been modulated based on a data signal. The light receiving element 5 receives incoming light 22 from an optical fiber 2 so as to generate the data signal. The sending lens 6 converges the outgoing light 21 from the light emitting element 4 into the optical fiber 2. The reflecting mirror 7 reflects the incoming light 22 from the optical fiber 2 onto the light receiving element 5.

The sending lens 6 and the reflecting mirror 7 are provided on an optical member 10. The light emitting element 4 is disposed on a sub-mount 12, which is made of a material with desirable heat radiating properties such as SiC. These constituting elements are positioned on a stem 13. Note that, the stem 13 is electrically connected to a circuit (not shown).

At least one end of the optical fiber 2 is fixed on an optical fiber plug 26. The optical fiber 2 and the optical communications module 1 are optically connected to each other by inserting the optical fiber plug 26 into a recess of a receptacle 27, which is part of the optical communications module 1. The optical fiber 2 has an enlarged portion 29, larger than a core portion 28, at the end portion. The enlarged portion 29 has a tapered portion 8, in which the diameter of the optical fiber 2 gradually increases toward an end face.

The outgoing light 21 generated by the light emitting element 4 spreads radially according to a radiation angle of the light emitting element 4 before it is converged according to an numerical aperture of the sending lens 6. Through the sending lens 6, the outgoing light 21 travels in the optical member 10 and couples with the optical fiber 2. On the other hand, most of the incoming light 22 from the optical fiber 2 is reflected by the reflecting mirror 7 in directions toward the light receiving element 5, in addition to being converged by the curvature of the reflecting mirror 7 into the light receiving element 5.

As described earlier, in a configuration where the outgoing light 21 and the incoming light 22 are spatially separated in the vicinity of the end face of the optical fiber 2, among the incoming light 22 from the optical fiber 2, those emerging from the area of incidence of the outgoing light 21 do not couple with the light receiving element 5.

In the present embodiment, the area of incidence of the outgoing light 21 is more toward the periphery of the optical fiber 2. This enables less incoming light 22 to emerge from the area of incidence of the outgoing light 21 and thereby enables the incoming light 22 to be efficiently coupled with the light receiving element 5. By thus causing the outgoing light 21 to enter the enlarged portion 29 at the end portion of the optical fiber 2, the optical communications module 1 can have an enlarged receiving area with high reception efficiency.

A portion of the optical member 10 from which the outgoing light 21 emerges has a prism face 11 that is slanted with respect to the optical axis of the optical fiber 2. The outgoing light 21 is refracted at the prism face 11 into the optical fiber 2. The optical member 10 also has the reflecting mirror 7 on the incident side of the incoming light 22. A portion of the reflecting mirror 7 makes up a light-shield (interference preventing member) 9, which is positioned in contact with or in the vicinity of the optical fiber 2.

The light-shield 9, which is shown in oblique lines for clarity in FIG. 3, is a portion of the reflecting mirror 7 and it should not be distinguished from the reflecting mirror 7. The reflecting mirror 7 is prepared from a thin film of aluminum or the like by a method such as a vapor deposition method.

What is notable about the optically coupled structure of the optical communication module 1 and the optical fiber 2 according to the present invention is that the outgoing light 21 is coupled with the enlarged portion 29 of the optical fiber 2, so as to increase the receiving area of the incoming light 22 that falls on the light receiving element 5. The following describes how such coupling is accomplished.

As described earlier, in a configuration where the outgoing light 21 and the incoming light 22 are spatially separated in a single optical fiber 2, the receiving area and thus availability of the incoming light 22 can be increased by reducing the sending area where the outgoing light 21 is coupled with the end face of the optical fiber 2. In this way, reception efficiency of the optical communications module 1 can be improved.

In order to achieve this, it is important to:

A. have a larger proportion of the receiving area than the sending area;

B. provide the sending area in an area where the quantity of incoming light 22 is small;

C. optimize a shape of the end face of the optical fiber 2 and optimize a light incident method of the outgoing light into the optical fiber 2; and D. separate the outgoing light 21 and the incoming light 22 from each other so as to prevent interference without generating a large loss.

Point A: The following describes how to set a larger proportion of the receiving area than the sending area, with reference to FIG. 1.

Figure 1:
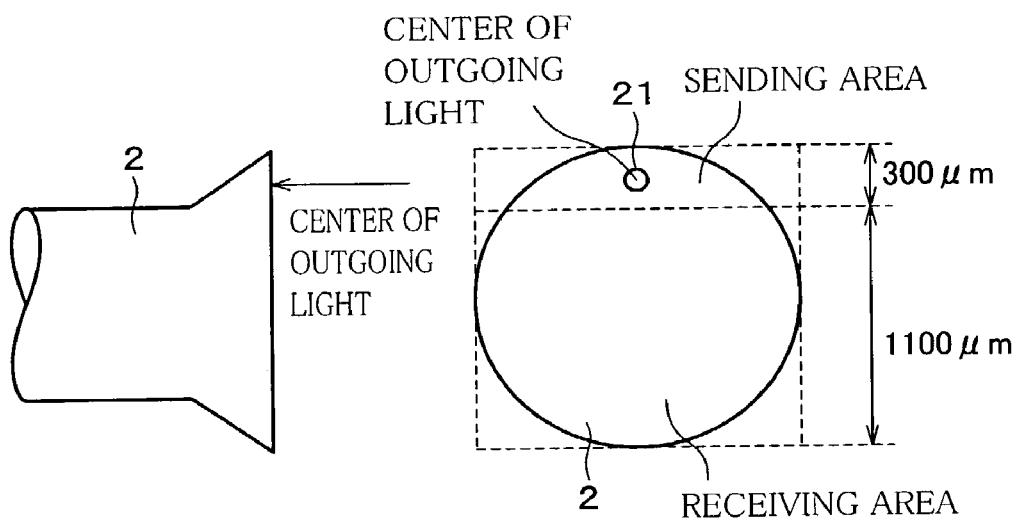
Figure 1:
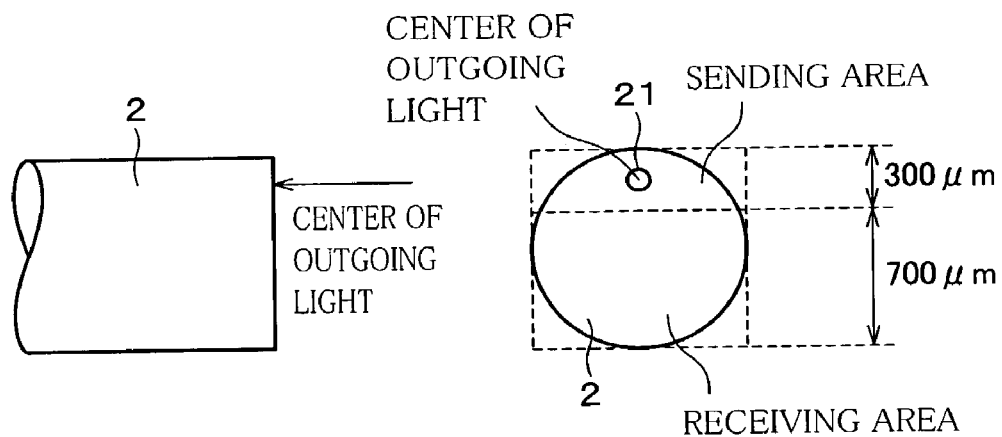

FIG. 1 shows a sending area and a receiving area in an end face of the optical fiber 2 in an optically coupled structure of the single-conductor optical fiber 2 and the optical communications module 1, in which FIG. 1(a) shows an optically coupled structure according to the present invention, and FIG. 1(b) shows a conventional optically coupled structure. It is assumed here that the optical fiber 2 is a POF with a core diameter of 1 mm, for example.

Considering assemble accuracy of the optical communications module 1 or accuracy of axial alignment of the optical fiber 2, it is required that the outgoing light 21 be incident on a position that provides for a certain margin from the periphery toward the center of the optical fiber 2. For example, when a tolerance for misalignment of the outgoing light 21 is ±100 μm and when the spot diameter of the outgoing light 21 at the end face of the optical fiber 2 is 100 μm, it is required, in order to reduce fluctuations of light quantity of the outgoing light, that the center of the outgoing light 21 be positioned 150 μm below the apex of the circumference, as shown in FIG. 1(b).

Further, considering misalignment of the outgoing light 21 in the other direction (down by 100 μm in FIG. 1(b)), the receiving area occupies the area 300 μm below the apex of the circumference, as shown in FIG. 1(b). That is, a lengthwise area ratio of sending area to receiving area in the radial direction is 3:7.

Referring to FIG. 1(a), the following describes a receiving area that is created by enlarging the optical fiber 2 according to the present invention, other conditions being the same. When the diameter of the enlarged end face of the optical fiber 2 is 1.4 mm and when the point of incidence of the outgoing light 21 is 150 μm below the apex of the circumference as in FIG. 1(b), the receiving area occupies the area 300 μm below the apex of the circumference. That is, a lengthwise area ratio of sending area to receiving area in the radial direction is 3:11.

By comparing FIG. 1(a) and FIG. 1(b), it can be seen that the receiving area in the end face of the optical fiber 2 can have a larger proportion when the end face of the optical fiber 2 is enlarged as in the present invention, as opposed to the conventional example with no such enlarged end face. In this way, the incoming light 22 from the optical fiber 2 can be used more efficiently.

Note that, in FIG. 1(a), the areas to the left and right of the point coupled with the outgoing light 21 in the end face of the optical fiber 2 may be used as the receiving area. This increases the quantity of incoming light 22 available from the optical fiber 2. That is, it is possible to increase the quantity of light that falls on the reflecting mirror 7, which in turn increases the quantity of incoming light 22 that couples with the light receiving element 5. In this way, reception efficiency can be further improved. Another effect is that fluctuations of transmission efficiency or reception efficiency can be reduced from conventionally even when the optical fiber 2 and the optical communications module 1 are misaligned at the same time.

Point B: The following describes how the sending area is provided in an area where the quantity of incoming light 22 is small. As shown in FIG. 2(a), the intensity of incoming light 22 that emerges from the enlarged portion 29 is relatively small in the configuration where the end face of the optical fiber 2 is enlarged. A loss of incoming light 22 can be reduced by causing the outgoing light 21 to enter an area where the intensity of the incoming light 22 is small, i.e., the enlarged portion 29 in the end face of the optical fiber 2.

As described, the point of incidence of the outgoing light 21 is set taking into consideration a tolerance for misalignment. Therefore, when, for example, a POF with a core diameter of 1 mm is used as in the foregoing example and when the point of incidence of the outgoing light 21 with respect to its center is 150 μm inside the circumference by taking into consideration a tolerance for misalignment, the enlarged portion 29 should preferably have a width of not less than 150 μm, so as to allow the outgoing light 21 to enter the enlarged portion 29 in the end face of the optical fiber 2. Namely, when the end face of the optical fiber 2 is enlarged symmetrically about the center as in FIG. 1 (*a*), the end face should preferably have a diameter of not less than 1.3 mm.

Figure 4:
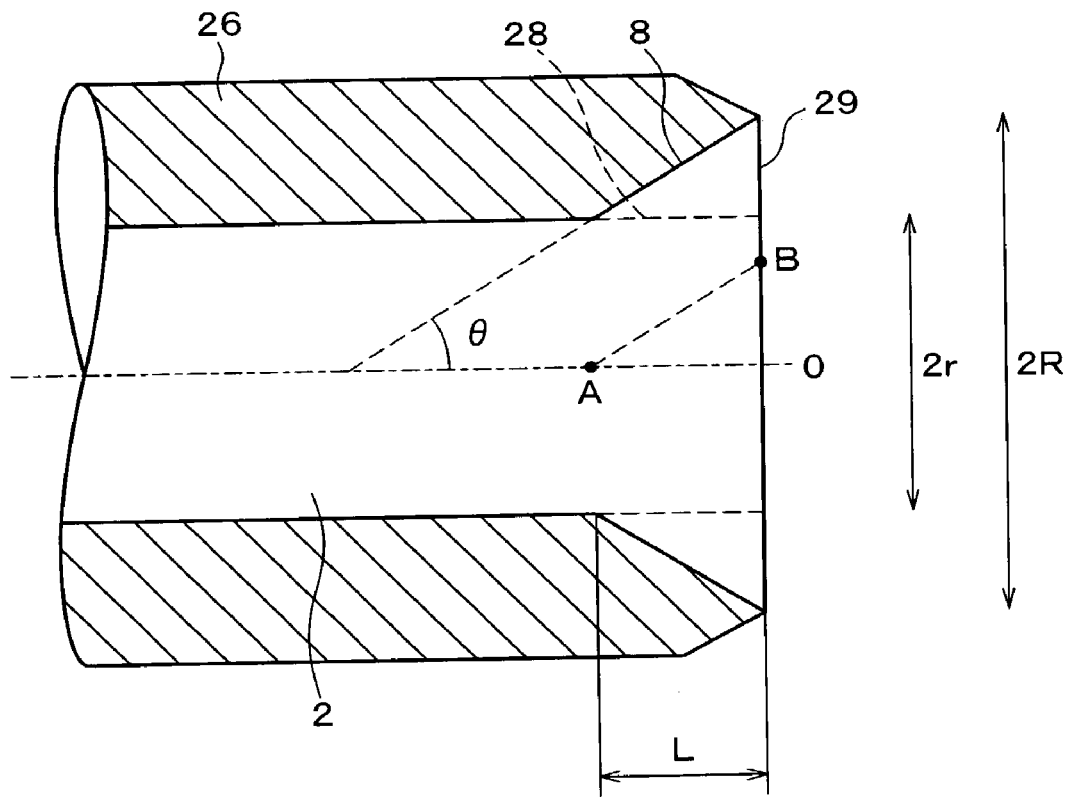
FIG. 4 is a cross sectional view showing an end portion of the optical fiber of FIG. 3.

Point C: The following describes how to optimize a shape of the end face of the optical fiber 2 and how to optimize a light incident method of the outgoing light into the optical fiber 2. Preferably, the end face of the optical fiber 2 should be tapered, i.e., the diameter of the optical fiber 2 should increases toward the end face, as shown in FIG. 4. By the tapered configuration, a propagation loss of the outgoing light 21 in the tapered portion 8 can be reduced and the outgoing light 21 can be smoothly guided into the optical fiber 2.

It is also preferable that the angle θ created by the optical axis of the optical fiber 2 and the tapered portion 8 is larger than the angle defined by the numerical aperture NA of the optical fiber 2. Here, the numerical aperture NA of the optical fiber 2 is decided according to JIS C6822 when the optical fiber 2 is POF.

The maximum angle of the light beam (incoming light 22) that emerges from the optical fiber 2 can be given substantially by $\sin^{-1}$ (NA). Thus, when the refractive index of the core portion 28 of the optical fiber 2 is np, the maximum angle $\alpha_{max}$ of propagation beam with respect to the optical axis in the optical fiber 2 is $\sin^{-1}$ (NA/np).

By setting the angle θ of the tapered portion 8 at $\alpha_{max}$ or greater, the quantity of light beam that emerges from the enlarged portion 29 of the optical fiber 2 can be reduced. This ensures reducing a light quantity of incoming light 22 at the enlarged portion 29. In addition, a loss of incoming light 22 at the tapered portion 8 can be reduced.

Further, a proportion of receiving area in the end face of the optical fiber 2 can be increased by coupling the outgoing light 21 with the enlarged portion 29. In this way, a loss of the incoming light 22 can be reduced. For example, when the optical fiber 2 has a numerical aperture NA of 0.3 and the core refractive index np of 1.5, the angle θ of the tapered portion 8 should preferably be 11.6° or greater.

Further, the outgoing light 21, when it couples with the enlarged portion 29 parallel to the optical axis of the optical fiber 2, partially falls on the inner wall of the tapered portion 8 or optical fiber plug 26 and these light beams do not couple with the core portion 28 of the optical fiber 2. In order to avoid this, the outgoing light 21 should preferably be coupled with the enlarged portion in a direction from the periphery toward the center of the optical fiber 2.

By causing the outgoing light 21 to enter the enlarged portion 29 in a direction from the periphery of the optical fiber 2, the sending optical system (sending lens 6) can be positioned more outwardly, which allows the receiving optical system (reflecting mirror 7) to be positioned more freely. This makes it easier to install a receiving optical system having high reception efficiency. Evidently, the angle of incidence of outgoing light 21 into the optical fiber 2 should preferably be smaller than the angle defined by the numerical aperture NA of the optical fiber 2.

It should be noted here that the term "core portion 28" is used to indicate the core, not the end face, of the optical fiber 2 where the optical fiber 2 is not enlarged. The "enlarged portion 29" is an enlarged portion of the core portion 28 and is a portion of the core. Hence, the core portion 28 and the enlarged portion 29 have the same refractive index. The core portion 28 may be enlarged by a method such as cutting, grinding, or melting. In POF, the core portion can easily be shaped into any form by pressing the end face against a hot plate of a desired shape.

The tapered portion 8 is described below in respect to its length. Given the same taper angle θ, the diameter 2R of the end face of the optical fiber 2 increases as the taper length L is increased (R=r+L·Tan (θ)). Increasing the end face diameter of the optical fiber 2 increases the area of the optical fiber 2 from which the light emerges. This reduces the quantity of incoming light 22 that emerges from the central portion of the optical fiber 2. In addition, it becomes difficult to design a small-sized receiving optical system that is capable of efficiently converging light. As a result, converging efficiency of the receiving optical system becomes poor.

Such scattering of incoming light 22 can be prevented by defining the taper length L with respect to the core diameter 2r of the optical fiber 2 as below. The light that emerges from the point (point A) at the center of the optical fiber 2, where the taper length L is zero, reaches the end face of the optical fiber 2 at the point (point B) distanced by about L·NA outwardly from the center of the optical fiber 2. By setting such a taper length L that the point B is within the core radius r of the optical fiber 2, spread of the incoming light 22 that radiates from the optical fiber 2 can be reduced. That is, the taper length L should be set to satisfy L<r/NA. For example, when the optical fiber 2 is a POF with a core diameter of 1 mm and a NA of 0.3, the taper length L should preferably be not more than 1.67 mm.

Figure 5:
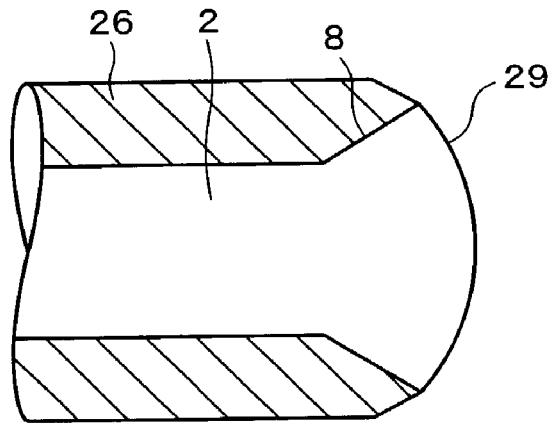
FIG. 5(a) through FIG. 5(c) are cross sectional views showing end portions of suitable optical fibers in one embodiment of the present invention.
Figure 5:
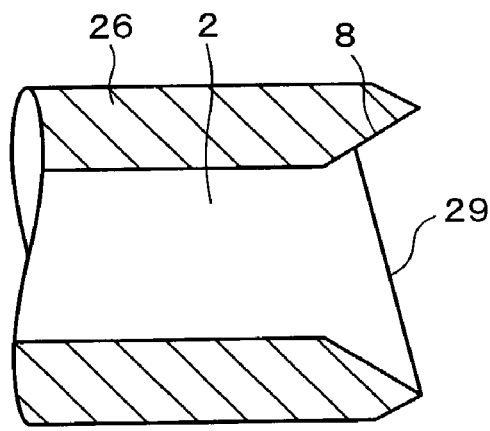
Figure 5:
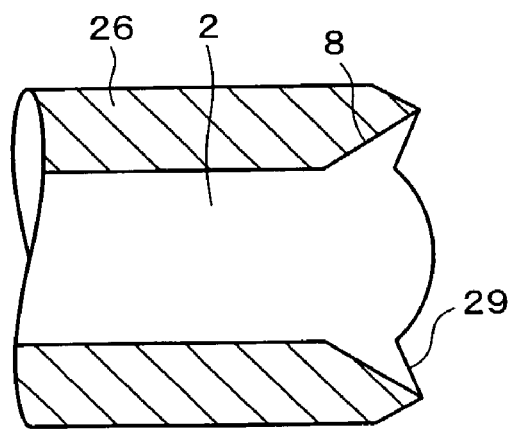

The following describes the optical fiber 2 in respect to a configuration of the end face. The end face of the optical fiber 2 is not necessarily required to be flat as in the foregoing example and may be spherical as shown in FIG. 5(*a*) or slanted as shown in FIG. 5(*b*), or may be a combination of these different shapes. By adopting different shapes for the end face of the optical fiber 2, it is possible to reduce far-end reflection of the optical fiber 2, as will be described later, or improve transmission efficiency or reception efficiency by causing the outgoing light 21 and the incoming light 22 to refract.

For example, as shown in FIG. 5(*a*), when the end face of the optical fiber 2 is spherical, the incoming light 22 that emerges from the optical fiber 2 is refracted at the spherical end face toward the center of the optical fiber 2. This enables the receiving optical system to more easily converge light into the light receiving element 5.

When the end face of the optical fiber 2 is slanted as shown in FIG. 5(*b*), the incoming light 22 is refracted at the slanted end face into a direction away from the optical fiber 2 (downward in FIG. 5(*b*)). This enables the receiving optical system to be positioned to receive the refracted incoming light 22 (bottom of FIG. 5(*b*)) and the sending optical system on the opposite side, thereby easily separating the outgoing light and incoming light from each other and allowing the optical systems to be positioned more freely.

Further, as shown in FIG. 5(c), the end face of the optical fiber 2 may be shaped so that its central portion is convexly spherical and the periphery is concavely spherical. With this configuration, the incoming light 22 that emerges from the central portion of the optical fiber 2 can be refracted and converged at the convex face so as to improve reception efficiency. The outgoing light 21, on the other hand, is refracted at the concave face on the periphery to be incident from more toward the periphery.

That is, because the outgoing light 21 is refracted at the concave face, the coupling angle of the outgoing light 21 on the optical fiber 2 does not exceed the numerical aperture NA of the optical fiber 2, even when the outgoing light 21 is incident on the optical fiber 2 at a larger angle than that defined by the numerical aperture NA of the optical fiber 2. This enables the outgoing light 21 to be incident from more toward the periphery, thereby allowing the receiving optical system to be positioned more freely and improving reception efficiency more easily.

Specifically, the end face configuration of the optical fiber 2 coupled with the outgoing light 21 and the angle of incidence of the outgoing light 21 onto the optical fiber 2 should preferably selected so that the angle created by the outgoing light 21 and the optical axis of the optical fiber 2 is smaller after the outgoing light 21 is incident than before the outgoing light 21 is incident. Namely, when the outgoing light 21 is incident from the periphery toward the center of the optical fiber 2, a concave face is selected for the end face of the optical fiber 2. On the other hand, a convex face is selected when the outgoing light 21 is incident from the center toward the periphery of the optical fiber 2.

By thus setting the configuration of the end face, coupling efficiency of the outgoing light 21 with the optical fiber 2 can be improved and the NA of coupling (excited NA) can be reduced. The smaller exited NA reduces a propagation loss of light in the optical fiber 2 and attains less mode dispersion. As a result, transmission band can be enhanced.

Point D: The following describes how outgoing light 21 and incoming light 22 are separated from each other to prevent interference without causing a large loss. The present invention can accommodate to single-conductor bidirectional communications by causing the outgoing light 21 to travel on the opposite side of (above) the light receiving element 5, with the reflecting mirror 7 in between, as shown in FIG. 3.

In the system of the present embodiment, the outgoing light 21 and the incoming light 22 are separated from each other by the thin film of the reflecting mirror 7 and therefore a loss at the separating section is substantially zero. Further, because the path of the outgoing light 21 is in close proximity with the reflecting mirror 7, the area of boundary between the sending area and the receiving area can be made substantially zero, thereby further increasing the receiving area.

Further, because the outgoing light 21 is refracted at the prism face 11 to enter the optical fiber 2 in a direction from the periphery of the optical fiber 2, the receiving area can be increased further to obtain higher reception efficiency.

As noted above, the cause of interference between incoming light 22 and outgoing light 21 includes:
(1) interference by near-end reflection;
(2) interference by internally scattered light;
(3) interference by the reflection in the module of the other end; and
(4) interference by far-end reflection.
In addition, (5) electrically-induced interference also causes problems.

Figure 6:
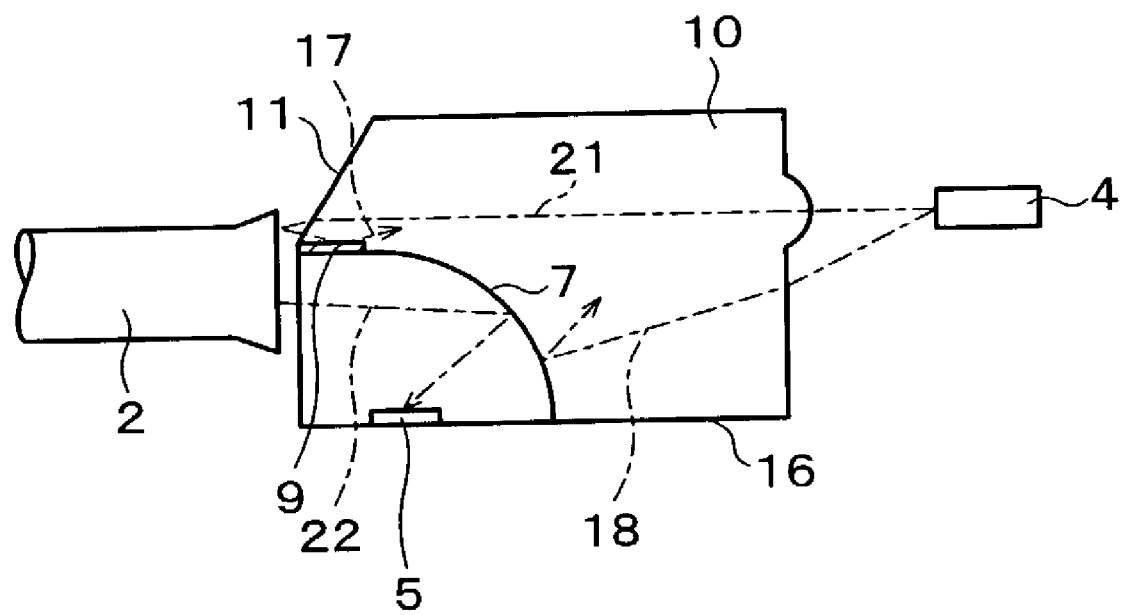
FIG. 6 is a schematic diagram in one embodiment of the present invention, showing how interference caused by near-end reflection and internally scattered light is prevented.

(1) Referring to FIG. 6, the following explains how interference by near-end reflection is prevented. The outgoing light 21 is refracted at the prism face 11 of the optical member 11 and enters the optical fiber 2 from the periphery of the optical fiber 2. Some of the outgoing light 21 (near-end reflected light 17) are reflected toward the optical axis of the optical fiber 2.

The near-end reflected light 17, by the provision of the light-shield 9 of the optical member 10, is reflected oppositely from the light receiving element 5 with respect to the reflecting mirror 7, because the light-shield 9 is provided at one end of the reflecting mirror 7 and joins an end of the prism face 11, either in contact with or by being distanced by several tens to several hundreds of microns from the optical fiber 2. Namely, the light-shield 9 prevents (blocks) the near-end reflected light 17 from entering the light receiving element 5.

(2) Referring to FIG. 6, the following explains how interference by internally scattered light is prevented. Some of the outgoing light 21 that emerge from the light emitting element 4 do not enter the sending lens 6 and scatter as stray light 18 within the optical communications module 1.

The stray light 18 is prevented from coupling with the light receiving element 5 by the reflecting mirror 7, which optically separates the light receiving element 5 from the light emitting element 4. Further, the reflecting mirror 7 also prevents accidental entry of the stray light 18 into the light receiving element 5, which may be caused when the light emitting element 4 is misaligned due to an assemble error of the light receiving element 4. This provides for a larger tolerance for assemble error of the light emitting element 4 and thereby reduces assemble cost.

In the same manner, the near-end reflected light 17, which also becomes stray light to scatter within the optical communications module 1, can also be prevented from coupling with the light receiving element 5. That is, the reflecting mirror 7 serves as an interference preventing member that optically separates the near-end reflected light 17 or stray light 18 from the light receiving element 5, in addition to reflecting and converging the incoming light 22 into the light receiving element 5.

Further, because the light receiving element 5 is optically separated by the reflecting mirror 7, it is not required to take into account the influence of stray light 18 to position the light receiving element 5. This enables the optical communications module 1 to be designed more freely so as to provide for such positioning that allows for easier assemble adjustment.

Figure 7:
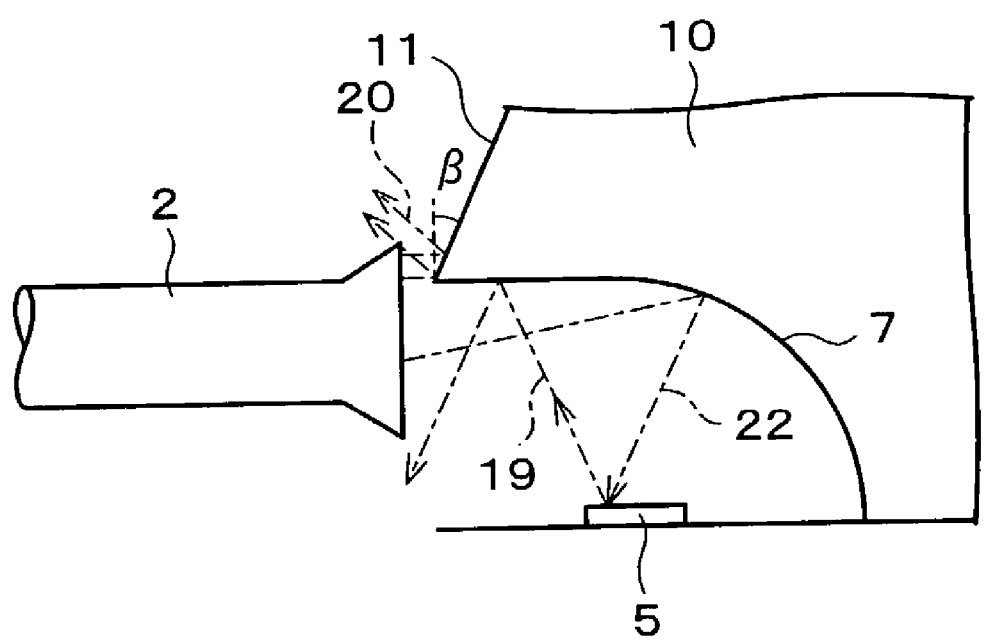
FIG. 7 is a schematic diagram of a relevant portion of FIG. 6, showing how interference caused by reflection in a module of the other party is prevented.

(3) Referring to FIG. 7, the following explains interference by the reflection in the module of the other end. In the optical communications module 1 of the present embodiment, the reflection in the module of the other end is caused when the light (receiver reflected light 19) reflected chiefly at the surface of the light receiving element 5 is coupled again with the optical fiber 2, or when prism reflected light 20, which is part of the incoming light 22 that has emerged from the optical fiber 2 and reflected at a light receiving surface (mainly, prism face 11) of the optical member 10, is coupled again with the optical fiber 2.

Generally, the light receiving surface of the light receiving element 5 has anti-reflective coating (AR coating) of a thin film that is made of, for example, silicon nitride, so as to prevent reflection of incoming light 22 and improve reception efficiency. With the anti-reflective coating, the receiver reflected light 19 can be reduced. It is however difficult to completely prevent reflection at the light receiving element 5. In addition, depending on the angle of incidence of the incoming light 22, reflectance may be increased on the contrary.

Most of the receiver reflected light 19 is coupled again with the optical fiber 2 by being reflected by the reflecting mirror 7 into the optical fiber 2, as shown in FIG. 7. It is therefore preferable that the position or shape of the light receiving element 5 and/or reflecting mirror 7 be selected, for example, so as to slant the light receiving element 5, so that the receiver reflected light 19 does not return to the optical fiber 2.

As to the prism reflected light 20, coupling of the prism reflected light 20 with the optical fiber 2 can be prevented, even after the prism reflected light 20 has entered the optical fiber 2, by optimizing the tilt angle of the prism face 11. Namely, coupling does not occur when the angle of incidence on the optical fiber 2 is larger than the numerical aperture NA of the optical fiber 2. This can be achieved by setting a tilt angle β of the prism face 11 to a value at or above substantially the numerical aperture NA of the optical fiber 2.

However, increasing the tilt angle of the optical fiber 2 also increases the angle of incidence of the outgoing light 21 into the optical fiber 2, with the result that coupling efficiency of the outgoing light 2 may be reduced or excitation may occur only in a high order mode. It is therefore required that the tilt angle β of the prism face 11 be set taking into consideration this tradeoff.

Further, as described, a configuration of the enlarged portion 29 of the optical fiber 2 varies the incident angle of the outgoing light 21 with respect to the optical axis of the optical fiber 2. This influence also needs to be taken into account in selecting the tilt angle β of the prism face 11. Alternatively, reflectance may be reduced by having anti-reflective coating on a surface (mainly prism face 11) of the optical member 10 where the incoming light 22 strikes.

(4) The following explains how interference by far-end reflection is prevented. Where the end face of the optical fiber 2 is perpendicular to the optical axis as shown in FIG. 3, a change in refractive index at the optical fiber 2 to air interface creates far-end reflection of about 4% with respect to the quantity of the emergent light. The far-end reflection can be reduced by modifying the end face configuration of the optical fiber 2.

For example, the configurations as shown in FIG. 5(a) through FIG. 5(c) may be adopted. With these configurations, the direction of far-end reflection at the end face of the optical fiber 2 can be changed and a coupling angle at or above the numerical aperture of the optical fiber 2 can be obtained. As a result, propagation of the far-end reflected light into the optical fiber 2 can be prevented.

For example, in a POF with a core diameter of 1 mm and a numerical aperture NA of 0.3, the configuration of FIG. 5(a) (curvature=1.5 mm) reduces the far-end reflection to 0.7% and the configuration of FIG. 5(b) (tilt angle of 10°) reduces the far-end reflection to 0.4%.

Further, with the end face configurations of the optical fiber 2 as shown in FIG. 5(a) through FIG. 5(c), for example, an increased receiving area and increased freedom in positioning the receiving optical system can be obtained at the same time by optimizing incidence and other conditions of the outgoing light 21, as described above.

(5) The following explains how electrically-induced interference is prevented. In FIG. 3, the stem 13 is connected to a ground electrode 5 of the light receiving element 5. The sub-mount 12 is an insulator such as SiC and electrically separates the light emitting element 4 and the light receiving element 5 from each other.

The reflecting mirror 7 is conducted to an electrode 16 that is provided on a lower part of the optical member 10, so that the reflecting mirror 7 is electrically connected to the stem 13 via the electrode 16. That is, the light receiving element 5 is electrically shielded from the light emitting element 4 by the reflecting mirror 7 and the stem 13, so as to suppress electrically-induced interference.

The reflecting mirror 7 is formed by vapor-depositing a highly reflective conductor, such as aluminum or gold, onto the optical member 10 of FIG. 3 from below. Simultaneously, the electrode 16 is formed. The reflecting mirror 7 and the electrode 16 are formed over the entire surface of the lower part of the optical member 10. Thus, the reflecting mirror 7 and the electrode 16 do not require patterning using a mask or the like and they can be formed easily The light emitting element 4 and a monitor photo diode 14 are covered with a transmitter cover 15. The transmitter cover 15 is bonded to the optical member 10 and the stem 13, so as to shield the light emitting element 4 from outside. Further, the transmitter cover 15 is electrically connected to the stem 13, so as to electrically shield the light emitting element 4 from outside.

A portion of the optical member 10 is used to make up a part of a sealing member, such as a cover glass, for the light emitting element 4. This reduces the number of components, which in turn reduces the cost of components and simplifies manufacturing process.

The following describes individual constituting element of the optical communications module 1 shown in FIG. 3. The optical fiber 2 is preferably a multi-mode optical fiber, for example, such as POF. The POF is composed of a core and a clad, wherein the former is made of a plastic with superior light transmissivity, such as PMMA (polymethyl methacrylate) or polycarbonate, and the latter is made of a plastic with a lower refractive index than that of the core.

The optical fiber 2, compared with optical fibers made of quartz, can more easily increase a core diameter from about 200 µm to about 1 mm. This makes it easier to adjust coupling with the optical communications module 1, thereby obtaining the bidirectional optical communications link 3 at low cost.

In a configuration where the outgoing light 21 and the incoming light 22 are spatially separated as in the present embodiment, the core should preferably have a diameter of 0.5 mm or larger, taking into consideration the space for disposing the optical system. In POF, the clad is relatively thin and is about 20 µm thick.

Alternatively, a PCF (plastic clad fiber), whose core and clad are made of quartz and polymer, respectively, may be used. PCF is more expensive than POF but has a smaller propagation loss and a wider transmission band. Thus, with PCF as a transmission medium, the bidirectional optical communications link 3 can perform long-distance communications at higher speed. Note that, use of quartz optical fibers is also possible.

Further, the optical fiber 2 is roughly categorized into SI (Step Index) type, in which the core section has a uniform refractive index, and GI (Gradient Index) type, in which the refractive index gradually decreases toward the periphery. In the present embodiment, the optical fiber 2 should preferably be of the SI type rather than the GI type. This is because the optical fiber 2 of the GI type impairs coupling efficiency of the outgoing light 21 at the periphery (enlarged portion 29) of the optical fiber 2, which narrows a possible range of incident angle of the outgoing light 21.

An end face of the optical fiber 2 should preferably be centrosymmetrical because an insertion direction into the optical communications module 1 is otherwise restricted, as shown in FIG. 5(b).

The light emitting element 4 may be a semiconductor laser or a light emitting diode (LED). It is preferable that the light emitting element 4, in addition to being inexpensive, emits light of a wavelength that causes a small propagation loss in the optical fiber 2. For example, when the optical fiber 2 is POF, a semiconductor laser with a wavelength of 650 nm, which is advantageous in mass production of DVD or the like, can be used. Behind the light emitting element 4 is disposed the monitor photo diode 14, so as to maintain a light quantity of the light emitting element 4 constant.

The light receiving element 5 converts intensity of modulated light it receives into electrical signals. The light receiving element 5 may be a photo diode that has high sensitivity in the wavelength range of the light emitting element 4. For example, a silicon-based PIN photo diode or an avalanche photo diode may be used.

The optical member 10 is made of a plastic such as PMMA or polycarbonate. One method of forming the optical member 10 is injection molding. A thin film of highly reflective metal, such as aluminum or gold, is formed on the reflecting mirror 7 to make up the reflecting face, for example, by a method such as a vapor deposition method. The reflecting mirror 7 can be formed easily without any patterning using a mask, by performing vapor deposition on the optical member 10 from below.

On a lower surface of the optical member 10 in contact with the stem 13 is formed the electrode 16. The electrode 16, as with the reflecting mirror 7, is formed by a vapor deposition method or the like. The electrode 16 at least partially connects to the reflecting mirror 7, so as to be conducted therewith.

The reflecting mirror 7 may be shaped to have a curved surface in the form of a spheroid or a sphere. The optical member 10 includes the sending lens 6, which converges the outgoing light 21, so as to couple it with the optical fiber 2, the prism face 11, which refracts the outgoing light 21 into the optical fiber 2, and a positioning section, which is used to position the light emitting element 5 and the light receiving element 4 (not shown).

By the multiple functionality of the optical member 10, only a small number of constituting elements is required and an assemble tolerance can be reduced. As a result, the optical communications module 1 can be obtained at low cost and in a small size. Further, it becomes possible to dispose the light emitting element 4, the light receiving element 5, and the optical member 10 on the stem 13 along the optical axis of the optical fiber 2. This eliminates complicated assemble steps and thereby reduces the number of manufacturing steps.

The following explains a measurement result of reception efficiency in the configuration of the present embodiment. The optical fiber 2 used in the measurement was a POF having a core diameter of 980 µm, a clad thickness of 10 µm, an end face configuration of FIG. 5(b) (curvature=1.5 mm), a taper angle θ of 16°, and a taper length L of 0.7 mm. The reflecting mirror 7 had a spherical surface with the curvature of 2.3 mm and had a reflectance of 89%. The light receiving element 5 was a PIN photo diode with an acceptance diameter of 0.35 mm. The sending area and the receiving area had a lengthwise area ratio of 3:11 in the radial direction.

The optical fiber plug 26 anchoring the optical fiber 2 was inserted into the optical fiber receptacle 27, so as to measure coupling efficiency (reception efficiency) of light with respect to the total light quantity from the optical fiber 2. The result was −3.5 dB (decibel). The same measurement was made using a POF having no enlarged portion 29 and with a lengthwise area ratio 3:7 of sending area to receiving area. The result was −5.5 dB. The measurement showed a 2 dB improvement of reception efficiency in the present embodiment over the conventional example.

Therefore, it can be said that reception efficiency, which varies with settings or positioning of the receiving optical system such as the reflecting mirror 7, or the type of optical fiber 2 or light receiving element 5 used, can be improved by increasing the receiving area by way of increasing the end face of the optical fiber 2.

It was also confirmed that the outgoing light 21, using a laser diode with a wavelength of 650 nm as the light emitting element 4, can couple with the optical fiber 2. Here, interference due to near-end reflection and internally scattered light was 0.05% with respect to the quantity of transmitted light. Note that, any transmission efficiency can be set using the sending lens 6.

The far-end reflection at the end face of the optical fiber 2 was 0.7% with respect to the quantity of emergent light from the optical fiber 2. The interference by the reflection in the module of the other end was 0.5% with respect to the quantity of emergent light from the optical fiber 2. Conducting full-duplex transmission using the optical communications module 1 with a transmission distance (length of optical fiber 2) of 20 m and a transmission speed of 500 Mbps has confirmed that the bit error rate was $10^{-12}$ or less.

Second Embodiment

Figure 8:
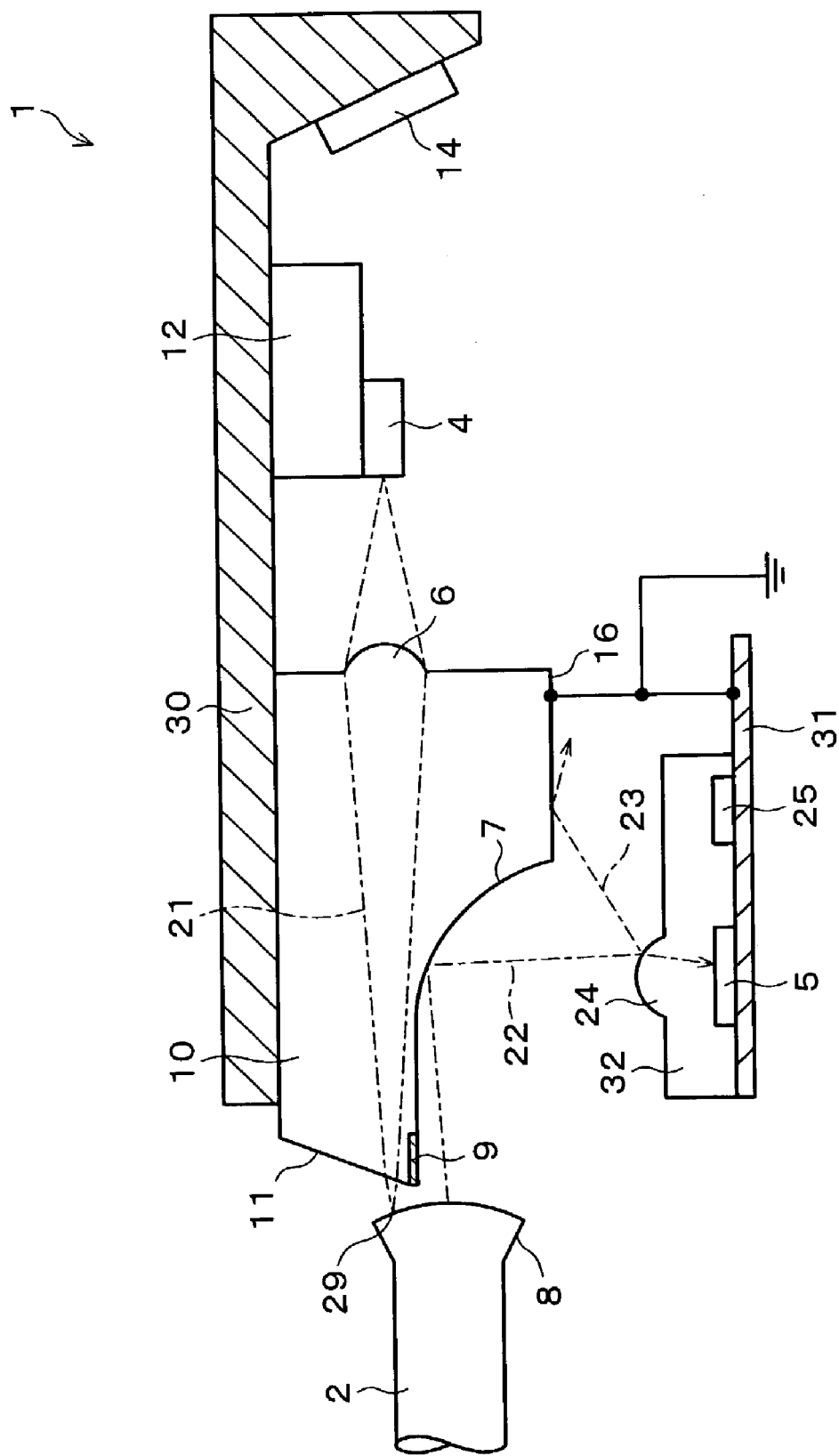
FIG. 8 is a cross sectional view showing an optically coupled structure of a single-conductor optical fiber and a bidirectional optical communications module of another embodiment of the present invention.

Another embodiment of the present invention is described below with reference to FIG. 8. Note that, members having the same functions as or similar functions to those described in the First Embodiment are given the same reference numerals and explanations thereof are omitted here. In a configuration of the present embodiment, as shown in FIG. 8, the incoming light 22 converged by the reflecting mirror 7 is converged again by a receiving lens (second receiving optical system) 24, so as to further improve reception efficiency.

A mold section 32, which is integrally formed with the receiving lens 24, seals the light receiving element 5 and a preamplifier 25 that is provided in the vicinity of the light receiving element 5. The mold section 32 protects the light receiving element 5 and the preamplifier 25 from external air and prevents performance decrement due to aging. Further, because the receiving lens 24 is integral with the mold section 32, a smaller size can be attained.

A second receiver reflected light 23 reflected by the receiving lens 24 also causes reflection at the module of the other end. The second receiver reflected light 23, however, does not return to the optical fiber 2 because it is scattered and reflected by the receiving lens 24 that is so configured to reflect light.

The electrode 16 partly conducts to the reflecting mirror 7. The electrode 16 also conducts to a ground electrode 31 of the light receiving element 5 and the preamplifier 25. Further, the electrode 16 serves to optically and electrically separate the light emitting element 4 and the light receiving element 5 from each other, so as to prevent interference caused by internally scattered light or prevent electrically-induced or electromagnetically induced interference.

The light emitting element 4 and the sub-mount 12 are disposed on a sending stem 30. The sending stem 30 is positioned by being aligned with the optical member 10. The sending stem 30 is electrically separated from the ground electrode 31 of the receiving part. The sending stem 30 also serves to dissipate heat of the light emitting element 4.

As described, reception efficiency can be improved with the optical communications module 1 shown in FIG. 8 and with the use of the reflecting mirror 7 and the receiving lens 24. Further, it becomes easier to prevent reflection at the module of the other end, internally scattered light, and near-end reflection, in addition to preventing electrically-induced or electromagnetically-induced interference. Further, the optical communications module 1 is small and inexpensive and can operate stably with less effect of aging.

Third Embodiment

Yet another embodiment of the present invention is described below with reference to FIG. 9. Note that, members having the same function as or similar functions to those described in the foregoing embodiments are given the same reference numerals and explanations thereof are omitted here.

Figure 9:
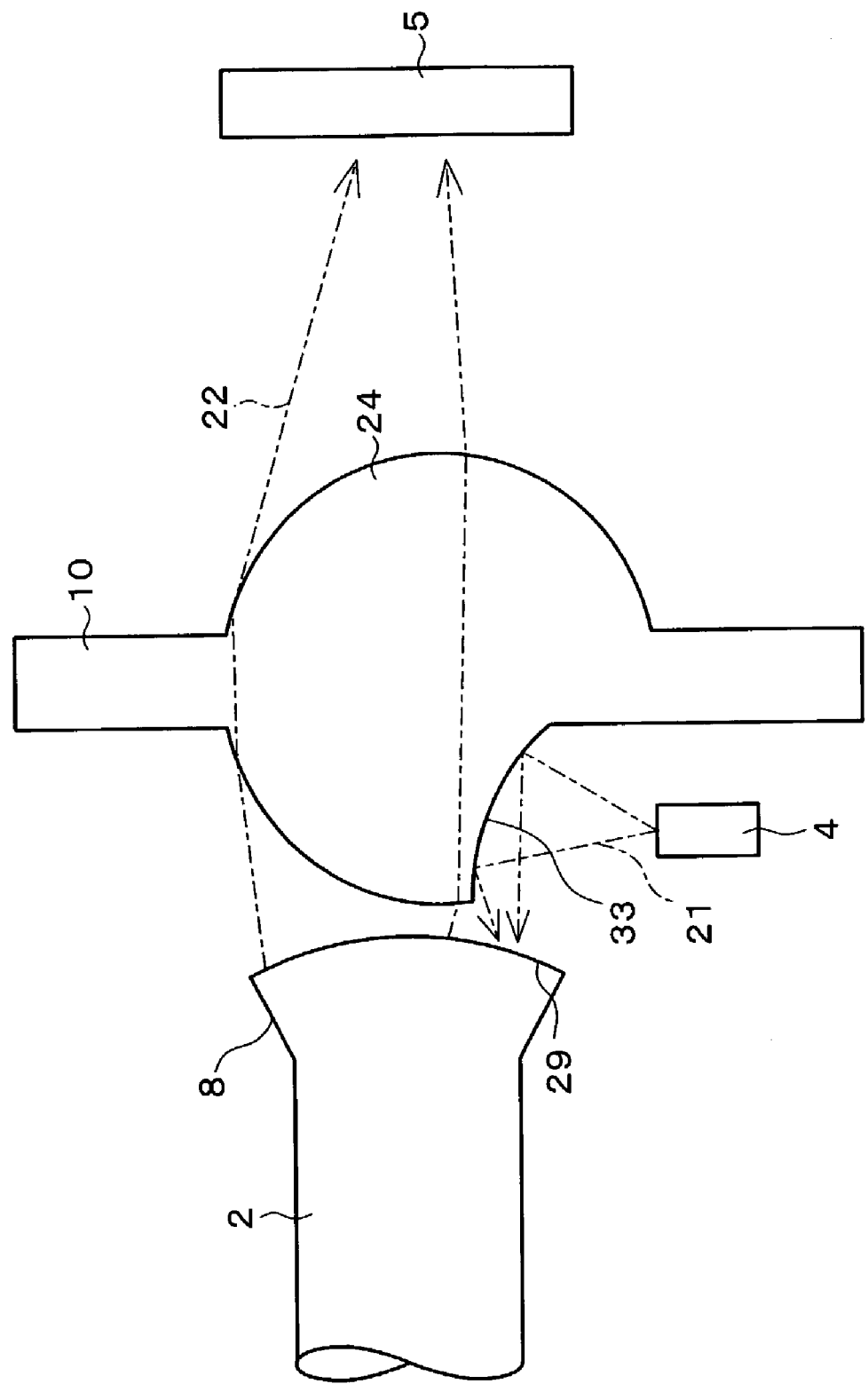
FIG. 9 is a schematic diagram showing an optically coupled structure of a single-conductor optical fiber and a bidirectional optical communications module of yet another embodiment of the present invention.

FIG. 9 shows a configuration which differs from the configurations of the foregoing embodiments in that the transmitting part and the receiving part of the optical system are reversed. The outgoing light 21 from the light emitting element 4 is reflected and converged by a guiding mirror 33 toward the optical fiber 2 before it is incident on the enlarged portion 29 of the optical fiber 2. The incoming light 22 from the optical fiber 2 is converged by the receiving lens 24 to couple with the light receiving element 5.

The guiding mirror 33 and the receiving lens 24 make up an optical block (optical member) 10. The guiding mirror 33 also serves to prevent interference by separating outgoing light 21 and incoming light 22 from each other.

Fourth Embodiment

Still another embodiment of the present invention is described below with reference to FIG. 10. Note that, members having the same functions as or similar functions to those described in the foregoing embodiments are given the same reference numerals and explanations thereof are omitted here.

Figure 10:
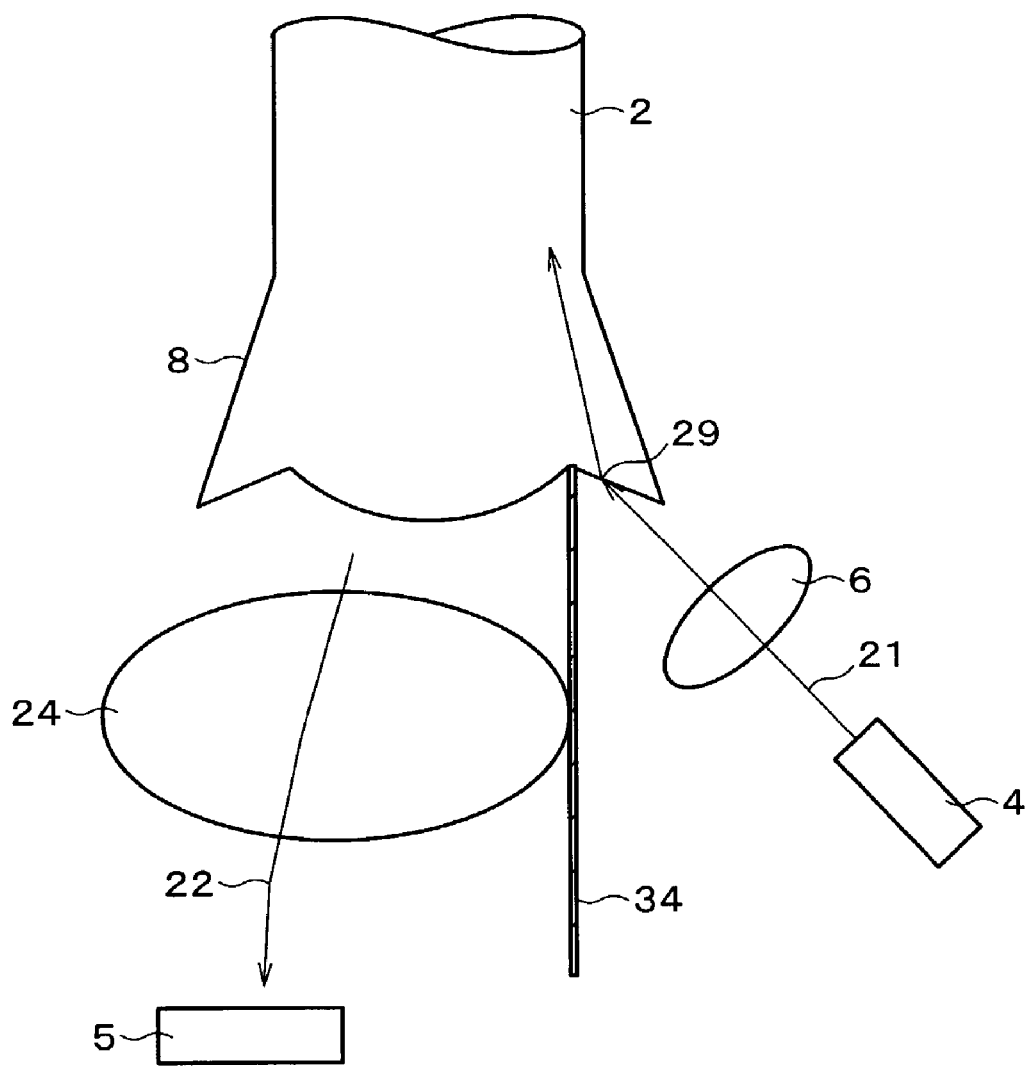
FIG. 10 is a schematic diagram showing an optically coupled structure of a single-conductor optical fiber and a bidirectional optical communications module of still another embodiment of the present invention.
Figure 11:
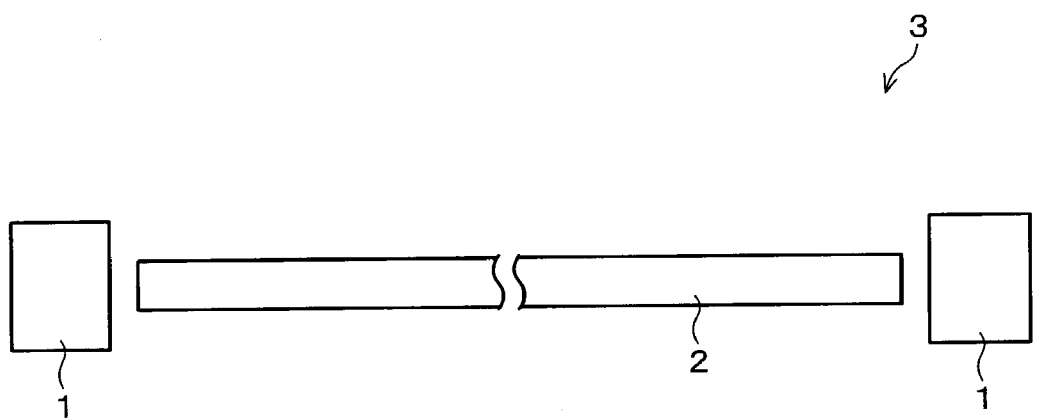
FIG. 11 is a schematic diagram showing a configuration of an optical communications link.
Figure 12:
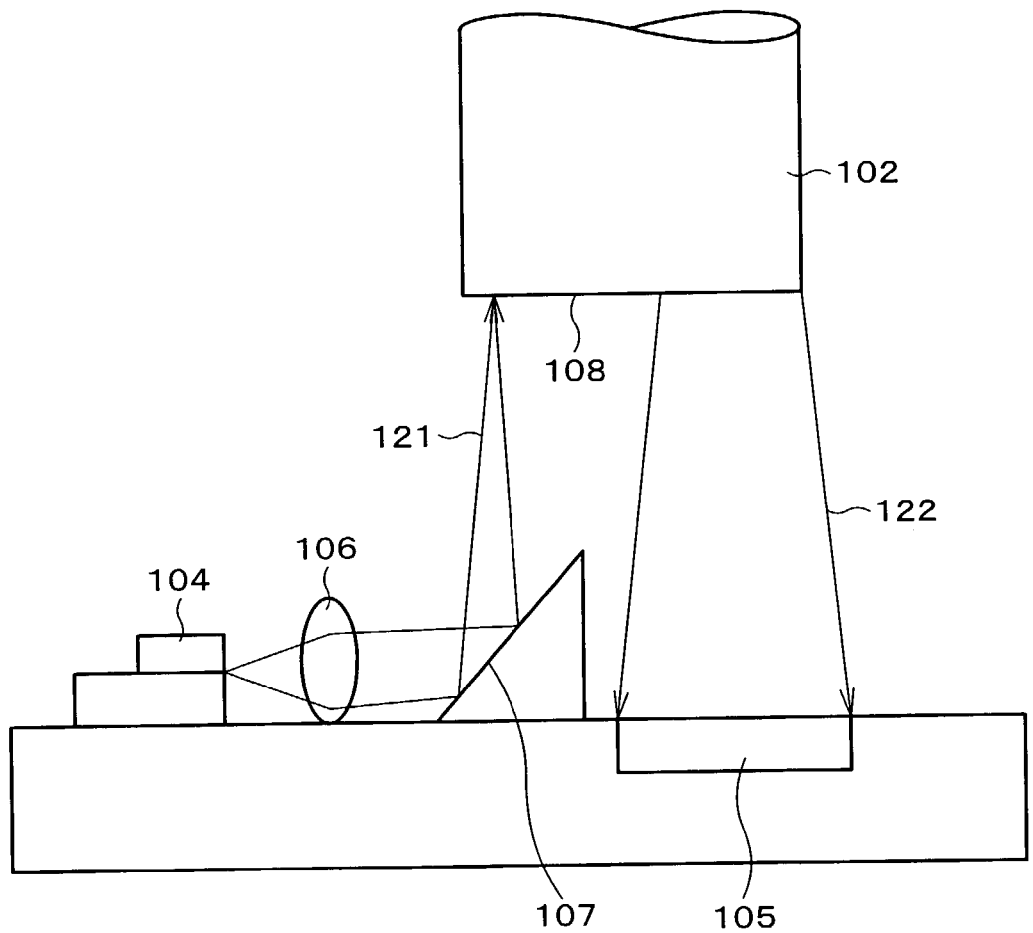
FIG. 12 is a schematic diagram showing an optically coupled structure of a single-conductor optical fiber and a bidirectional optical communications module of a conventional example.

FIG. 10 shows an optical configuration in which the outgoing light 21 is incident from the periphery of the optical fiber 2. The outgoing light 21 from the light emitting element 4 is converged by the sending lens 6 to couple with the enlarged portion 29 of the optical fiber 2, from the periphery toward the center of the optical fiber 2. The optical fiber 2 has an end face as shown in FIG. 5(c), in which the periphery is concavely spherical and a central portion is convexly spherical, the concave portion making up the enlarged portion 29.

The angle created by the outgoing light 21 and the optical axis of the optical fiber 2 becomes smaller as the outgoing light 21 is refracted into the optical fiber 2. This enables the outgoing light 21 to couple with the optical fiber 2 even when the angle of incidence with the optical fiber 2 is greater than the numerical aperture of the optical fiber 2, making it possible to place the sending lens (sending optical system) more toward the periphery (to the right in FIG. 10). This creates more space for the receiving lens 24 (receiving optical system), thereby easily disposing the receiving optical system with high reception efficiency.

Between the sending optical system and the receiving optical system is disposed an interference preventing member 34, which prevents interference of outgoing light 21 and incoming light 22. The interference preventing member 34 is provided either in contact with or in the vicinity of the end face of the optical fiber 2.

As described, with the optically coupled structure of the optical communications module 1 and the single-conductor optical fiber 2 of the present embodiment, it is possible to prevent near-end reflection, internally scattered light (stray light), far-end reflection, and interference by the reflection at the module of the other end. In addition, electrically-induced interference can be reduced. As a result, full-duplex bidirectional optical communications can be efficiently carried out with single optical fiber 2.

Specifically, optical communications link 3 with high reception efficiency can be obtained by increasing a receiving area and by providing the optical system more freely. This can be achieved by increasing an end face of the optical fiber 2 to create the enlarged portion 29 that couples with outgoing light 21, and by optimizing an end face configuration of the optical fiber 2 and incident conditions of the outgoing light 21. Further, by the multi-functionality of the optical member 10, the optical communications module 1 can be manufactured easily at low cost and in a small size.

It should be noted that the described embodiments are just examples of the present invention and the configurations or structures described in the foregoing embodiment do not limit the scope of the present invention in any ways. The gist of the present invention is that outgoing light 21 is coupled with enlarged portion 29 of the optical fiber 2. Accordingly, various effects described in the foregoing embodiments can also be obtained with other configurations or structures of the optical system. For example, the present invention may have the following arrangements.

An optically coupled structure of a single-conductor optical fiber and a bidirectional communications module may be adapted to carry out bidirectional optical communications using the single-conductor optical fiber, the optical communications module including a light emitting element, which generates outgoing light, and a light receiving element, which receives incoming light that emerges from the optical fiber, the optical fiber having an enlarged portion, which is an enlarged portion of a core section, in an end face coupled with the optical communications module, the light receiving element receiving at least a portion of incoming light that emerges from the area other than the end face of the optical fiber where the outgoing light couples.

According to this arrangement, because the incoming light used is from the area other than the area of incidence of the outgoing light, the outgoing light and incoming light reflected at the end face of the optical fiber can easily be separated from each other to reduce interference. Further, by the enlarged end face of the optical fiber, a larger assemble tolerance can be provided. It is also possible to readily increase the receiving area and improve reception efficiency.

The optically coupled structure may be adapted so that the outgoing light at least partially couples with the enlarged portion of the optical fiber.

According to this arrangement, the receiving area can be increased to allow outgoing light to enter the area where a quantity of incoming light is small, thereby efficiently coupling the incoming light from the optical fiber with the light receiving element.

The optically coupled structure may be adapted to further include a receiving optical system, which converges and couples the incoming light with the light receiving element.

According to this arrangement, the receiving optical system can be used to guide the incoming light into the light receiving element. In addition, the incoming light can be efficiently converged on a small light receiving element and the light receiving element can be disposed more freely.

The optically coupled structure may be adapted to further include an interference preventing member, which prevents the outgoing light from partially coupling with the light receiving element.

According to this arrangement, interference of outgoing light with incoming light can be prevented and a high S/N ratio can be obtained.

The optically coupled structure may be adapted so that the interference preventing member is a reflecting mirror, which reflects and converges the incoming light to couple it with the light receiving element.

According to this arrangement, the receiving optical system and the interference preventing member can be provided as a single unit. This enables a size of the optical communications module to be reduced. Further, by providing the interference preventing member as a thin film mirror, a reduction of reception efficiency caused by the interference preventing member can be prevented and high reception efficiency can be obtained.

Further, the optically coupled structure may be adapted so that the outgoing light is refracted at the end face of the optical fiber to couple with the optical fiber.

According to this arrangement, the outgoing light can be coupled with the optical fiber by refracting it into the optical fiber, even when the angle of incidence of the outgoing light into the optical fiber is at or greater than the numerical aperture of the optical fiber. This enables the sending optical system to be disposed more freely. Further, the exited NA can be reduced more easily, which reduces a propagation loss or mode dispersion in the optical fiber and thereby increases a transmission band.

Further, the optically coupled structure may be adapted so that the end face of the optical fiber is so shaped and an angle of incidence of the outgoing light on the optical fiber is so set that the angle created by the optical axis of the outgoing light and the optical axis of the optical fiber before the outgoing light couples with the optical fiber is smaller than that after the outgoing light couples with the optical fiber.

According to this arrangement, by reducing the numerical aperture of the optical fiber with respect to the incident outgoing light, a band reduction due to mode dispersion can be reduced. Further, the sending optical system can be disposed at a distant position from the optical axis of the optical fiber. As a result, the optical system can be disposed more freely.

Further, the optically coupled structure may be adapted so that the outgoing light couples with the optical fiber with its optical axis being slanted from the periphery toward the center of the optical fiber.

According to this arrangement, because the outgoing light is incident from the periphery, a larger receiving area can be provided. This allows the receiving optical system with high reception efficiency to be disposed more easily and more freely.

The optically coupled structure may be adapted so that the optical fiber has a tapered portion, which gradually increases its diameter toward the end face, and the angle created by the optical axis of the optical fiber and the tapered portion is larger than the angle defined by the numerical aperture of the optical fiber.

According to this arrangement, the incoming light propagating in the optical fiber does not strike the tapered portion and a loss of the incoming light can be reduced. Further, the outgoing light can be guided into the core section of the optical fiber more easily.

Further, the optically coupled structure may be adapted to satisfy $L<r<NA$, where L is the length of the tapered portion, r is the core radius of the optical fiber, and NA is the numerical aperture of the optical fiber.

According to this arrangement, there is less scattering of incoming light that emerges from the optical fiber and scattering of incoming light therefrom can be suppressed. This makes it easier to converge the incoming light.

The optically coupled structure may be adapted so that the end face of the optical fiber has a concavely shaped peripheral portion and a convexly shaped central portion.

According to this arrangement, by refracting the outgoing light at the convex portion, the outgoing light can be coupled more toward the periphery of the optical fiber. Further, because the incoming light from the optical fiber is converged at the convex portion, the receiving optical system can be designed more easily and reception efficiency can be improved.

The optically coupled structure may be adapted so that the optical fiber is a plastic optical fiber.

According to this arrangement, the optical fiber, being POF, has a small bending loss and is hard to bent. In addition, a thick optical fiber with a core diameter of about 1 mm can easily be fabricated. This enables the optical fiber to be easily adjusted to couple with the bidirectional optical communications module, in addition to inexpensively providing a bidirectional optical communications link. Further, the end face can easily be formed into any shape.

As described, the present invention provides an optical communications module for carrying out bidirectional optical communications using a single-conductor optical fiber as a transmission medium, the optical communications module including: a light emitting element, which generates outgoing light, a sending optical system, which couples the outgoing light with the end portion of the single-conductor optical fiber, a light receiving element, which receives incoming light that emerges from the single-conductor optical fiber; and a receiving optical system, which couples the incoming light with the light receiving element, wherein the receiving optical system is disposed so that the light receiving element receives incoming light that emerges from an enlarged portion of the single-conductor optical fiber, the enlarged portion being an enlarged portion of a light-carrying core section of the single-conductor optical fiber in at least one of end portions of the single-conductor optical fiber.

According to this arrangement, the intensity of incoming light that emerges from an area of the end face coupled with the outgoing light can be reduced. Thus, a reduction of reception efficiency can be suppressed even though the light receiving element does not receive incoming light that emerges from this area.

Further, the present invention provides an optical communications module for carrying bidirectional optical communications using a single-conductor optical fiber as a transmission medium, the optical communications module including: a light emitting element, which generates outgoing light; a sending optical system, which couples the outgoing light with the single-conductor optical fiber, a light receiving element, which receives incoming light that emerges from the single-conductor optical fiber; and a receiving optical system, which couples the incoming light with the light receiving element, wherein the light emitting element and the sending optical system are disposed so that an enlarged portion of the single-conductor optical fiber, which is provided as an enlarged portion of a light-carrying core section of the single-conductor optical fiber in at least one of end portions of the single-conductor optical fiber, at least partially constitutes an area of the end portion coupled with the outgoing light.

According to this arrangement, the intensity of incoming light that emerges from an area of the end face coupled with the outgoing light is notably weak. Thus, a large reduction of reception efficiency can be suppressed even though the light receiving element does not receive incoming light that emerges from this area.

Further, in the optical communications module having the foregoing arrangement, the light emitting element and the sending optical system are disposed so that the outgoing light couples with the end portion of the single-conductor optical fiber by traveling inward in an oblique direction.

According to this arrangement, the light emitting element and the sending optical system can be disposed at a distant position from the optical axis of the optical fiber, as compared with the case where the outgoing light is coupled with the end portion of the optical fiber, parallel to the optical axis of the optical fiber. This enables the light emitting element and the sending optical system to be disposed more outwardly in the radial direction from the area of the end face coupled with the outgoing light. As a result, the light receiving element and the receiving optical system can be disposed more freely.

The receiving optical system may be disposed so that the light receiving element receives incoming light that emerges from the end portion of the single-conductor optical fiber having the enlarged portion.

The present invention provides an optical fiber as a transmission medium for carrying out optical communications, the optical fiber including: a light-carrying core section; an enlarged portion, which is an enlarged portion of a light-carrying core section of the optical fiber in at least one of end portions of the optical fiber; and a tapered portion, which extends from the enlarged portion of the end portion, tapering toward an optical axis of the optical fiber, the tapered portion being provided so that an angle created by the optical axis of the optical fiber and the tapered portion is greater than an angle defined by a numerical aperture of the optical fiber.

According to this arrangement, the intensity of incoming light that emerges from an area coupled with the outgoing light can be reduced. Thus, a reduction of reception efficiency can be suppressed even though the light receiving element does not receive incoming light that emerges from this area coupled with the outgoing light.

Further, the present invention provides an optical fiber as a transmission medium for carrying out optical communications, the optical fiber including: a light-carrying core section; and an enlarged portion, which is an enlarged portion of a light-carrying core section of the optical fiber in at least one of end portions of the optical fiber, the end portion with the enlarged portion being a concave portion.

According to this arrangement, the angel created by the propagation direction and the optical axis of the outgoing light before the outgoing light couples with the end portion can be increased. This enables the light emitting element and the sending optical system, which are used to cause outgoing light to enter the optical fiber, to be disposed more outwardly than conventionally in the radial direction. In addition, constituting elements of the optical communications module for optical communications can be disposed more freely.

Further, in the optical fiber having the foregoing arrangement, the end portion with the enlarged portion has a convex central portion.

According to this arrangement, by converging the incoming light that emerges from the end portion, the receiving optical system, which is used to couple incoming light with the light receiving element, can be provided in a small size. This enables the size of the optical communications module to be reduced, in addition to allowing each constituting element of the optical communications module to be disposed more freely.

Further, the present invention provides an optically coupled structure that includes: a single-conductor optical fiber; and an optical communications module for carrying out bidirectional optical communications with the single-conductor optical fiber as a transmission medium, the single-conductor optical fiber including a light-carrying core section and an enlarged portion, the enlarged portion being an enlarged portion of a light-carrying core section of the single-conductor optical fiber in at least one of end portions of the single-conductor optical fiber, the optical communications module including a light emitting element, which generates outgoing light, a sending optical system, which couples the outgoing light with the single-conductor optical fiber, a light receiving element, which receives incoming light that emerges from the single-conductor optical fiber, and a receiving optical system, which couples the incoming light with the light receiving element, the light receiving element and the receiving optical system being disposed so as to receive incoming light that emerges from the end portion of the single-conductor optical fiber having the enlarged portion.

According to this arrangement, the intensity of incoming light that emerges from an area of the end portion coupled with the outgoing light can be reduced. Thus, a reduction of reception efficiency can be suppressed even though the light receiving element does not receive incoming light that emerges from this area coupled with the outgoing light.

The present invention provides an optically coupled structure that includes: a single-conductor optical fiber; and an optical communications module for carrying out bidirectional optical communications with the single-conductor optical fiber as a transmission medium, the single-conductor optical fiber including a light-carrying core section and an enlarged portion, the enlarged portion being an enlarged portion of a light-carrying core section of the single-conductor optical fiber in at least one of end portions of the single-conductor optical fiber, the optical communications module having a light emitting element, which generates outgoing light, a sending optical system, which couples the outgoing light with the end portion of the single-conductor optical fiber, a light receiving element, which receives incoming light that emerges from the single-conductor optical fiber, and a receiving optical system, which couples the incoming light with the light receiving element, the light emitting element and the sending optical system being provided so that the enlarged portion at least partially constitutes an area of the end portion of the single-conductor optical fiber coupled with the outgoing light.

According to this arrangement, the intensity of incoming light that emerges from an area coupled with the outgoing light is notably weak. Thus, a large reduction of reception efficiency can be suppressed even though the light receiving element does not receive incoming light that emerges from this area coupled with the outgoing light.

Further, in the optically coupled structure according to the present invention having the foregoing arrangement, the end portion of the single-conductor optical fiber is so shaped and an angle of incidence of the outgoing light on the single-conductor optical fiber is so set that an angle made by a propagation direction of the outgoing light and the optical axis of the single-conductor optical fiber before the outgoing light couples with the single-conductor optical fiber is greater than that after the outgoing light couples with the single-conductor optical fiber.

According to this arrangement, by reducing the numerical aperture of the optical fiber with respect to the incident outgoing light, a band reduction due to mode dispersion can be reduced. Further, the sending optical system can be disposed at a distant position from the optical axis of the optical fiber. As a result, the optical system can be disposed more freely.

Further, in the optically coupled structure according to the present invention, the light emitting element and the sending optical system are disposed so that the outgoing light couples with the end portion of the single-conductor optical fiber by traveling inward in an oblique direction.

According to this arrangement, the light emitting element and the sending optical system can be disposed at a distant position from the optical axis of the optical fiber, as compared with the case where the outgoing light is coupled with the end portion of the optical fiber, parallel to the optical axis of the optical fiber. Further, by causing the outgoing light to enter the optical fiber in an inwardly oblique direction, a wider receiving area can be provided. As a result, the light receiving element and the receiving optical system can be disposed more freely, enabling the receiving optical system with high reception efficiency to be disposed more easily.

The receiving optical system may be disposed so that the light receiving element receives incoming light that emerges from the end portion of the single-conductor optical fiber having the enlarged portion.

Further, in the optically coupled structure having the foregoing arrangement, the single-conductor optical fiber includes a tapered portion, which extends from the enlarged portion of the end portion, tapering toward an optical axis of the single-conductor optical fiber, the tapered portion being provided so that an angle created by the optical axis of the single-conductor optical fiber and the tapered portion is greater than an angle defined by a numerical aperture of the single-conductor optical fiber.

According to this arrangement, the enlarged portion of the end portion has an area from which no propagating light emerges. This reduces a quantity of incoming light per unit area of the enlarged portion.

Thus, it is ensured that the intensity of incoming light that emerges from the area coupled with the outgoing light is reduced when the area coupled with the outgoing light is included in the enlarged area. Thus, it is ensured that reception efficiency is improved, even though the light receiving element does not receive incoming light that emerges from the area coupled with the outgoing light.

Further, the optically coupled structure according to the present invention having the foregoing arrangement satisfies L<r/NA, where L is the length of the tapered portion, r is the core radius of the single-conductor optical fiber, and NA is the numerical aperture of the single-conductor optical fiber.

According to this arrangement, the outgoing incoming light that emerges from the optical fiber does not spread at the end face of the optical fiber, thus easily converging incoming light.

Further, in the optically coupled structure according to the present invention having the foregoing arrangement, the end portion of the single-conductor optical fiber having the enlarged portion has a concavely formed peripheral portion and a convexly formed central portion.

According to this arrangement, by refracting outgoing light at the concave portion, the outgoing light can be coupled more toward the periphery of the optical fiber. Further, because the incoming light that emerges from the optical fiber is converged at the convex portion, designing of the receiving optical system is easier and reception efficiency can be improved.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An optical communications module for carrying bidirectional optical communications using a single-conductor optical fiber having at least one end portion as a transmission medium, comprising:
    a light emitting element, which generates outgoing light;
    a sending optical system, which couples the outgoing light with the single-conductor optical fiber;
    a light receiving element, which receives incoming light that emerges from the single-conductor optical fiber; and
    a receiving optical system, which couples the incoming light with the light receiving element,
    wherein the light emitting element and the sending optical system are disposed so that an enlarged portion of the single-conductor optical fiber, which is an enlarged portion of a light-carrying core section of the single-conductor optical fiber in the at least one end portion of the single-conductor optical fiber, at least partially constitutes an area of the at least one end portion coupled with the outgoing light, the end portion having a center and being divisible into respective halves, the area being disposed in one of the halves and away from the center.

2. The optical communications module as set forth in claim 1, wherein the light emitting element and the sending optical system are disposed so that the outgoing light couples with the at least one end portion of the single-conductor optical fiber by traveling inward in an oblique direction.

3. The optical communications module as set forth in claim 1, wherein the receiving optical system is disposed so that the light receiving element receives incoming light that emerges from the at least one end portion of the single-conductor optical fiber having the enlarged portion.

4. The optical communications module of claim 1, wherein said single-conductor optical fiber includes
    a tapered portion, which extends from the enlarged portion of the at least one end portion, tapering toward an optical axis of the optical fiber,
    the tapered portion being provided so that an angle created by the optical axis of the optical fiber and the tapered portion is greater than an angle defined by a numerical aperture of the optical fiber.

5. The optical communication module of claim 1, wherein the at least one end portion with the enlarged portion is a concave portion.

6. The optical fiber as set forth in claim 5, wherein the at least one end portion with the enlarged portion has a convex central portion.

7. An optically coupled structure, comprising:
    a single-conductor optical fiber; and an optical communications module for carrying out bidirectional optical communications with the single-conductor optical fiber as a transmission medium, the single-conductor optical fiber including a light-carrying core section and an enlarged portion, the enlarged portion being an enlarged portion of a light-carrying core section of the single-conductor optical fiber in an at least one end portion of the single-conductor optical fiber, the optical communications module having a light emitting element, which generates outgoing light, a sending optical system, which couples the outgoing light with the at least one end portion of the single-conductor optical fiber, a light receiving element, which receives incoming light that emerges from the single-conductor optical fiber, and a receiving optical system, which couples the incoming light with the light receiving element, the light emitting element and the sending optical system being provided so that the enlarged portion at least partially constitutes an area of the at least one end portion of the single-conductor optical fiber coupled with the outgoing light, the end portion having a center and being divisible into respective halves, the area being disposed in one of the halves and away from the center.

8. The optically coupled structure as set forth in claim 7, wherein the at least one end portion of the single-conductor optical fiber is so shaped and an angle of incidence of the outgoing light on the single-conductor optical fiber is so set that an angle made by a propagation direction of the outgoing light and the optical axis of the single-conductor optical fiber before the outgoing light couples with the single-conductor optical fiber is greater than that after the outgoing light couples with the single-conductor optical fiber.

9. The optically coupled structure as set forth in claim 7, wherein the light emitting element and the sending optical system are disposed so that the outgoing light couples with the at least one end portion of the single-conductor optical fiber by traveling inward en an oblique direction.

10. The optical communications module as set forth in claim 7, wherein the receiving optical system is disposed so that the light receiving element receives incoming light that emerges from the at least one end portion of the single-conductor optical fiber having the enlarged portion.

11. The optically coupled structure as set forth in claim 7, wherein the single-conductor optical fiber includes a tapered portion, which extends from the enlarged portion of the at least one end portion, tapering toward an optical axis of the single-conductor optical fiber, the tapered portion being provided so that an angle created by the optical axis of the single-conductor optical fiber and the tapered portion is greater than an angle defined by a numerical aperture of the single-conductor optical fiber.

12. The optically coupled structure as set forth in claim 7, wherein the tapered portion is provided to satisfy $L < r/NA,$ where L is a length of the tapered portion, r is a core radius of the single-conductor optical fiber, and NA is a numerical aperture of the single-conductor optical fiber.

13. The optically coupled structure as set forth in claim 7, wherein the end portion of the single-conductor optical fiber having the enlarged portion has a concavely formed peripheral portion and a convexly formed central portion.

* * * * *